(12) United States Patent
Tamachi et al.

(10) Patent No.: US 10,366,844 B2
(45) Date of Patent: Jul. 30, 2019

(54) ELECTROCHEMICAL CELL

(71) Applicant: Seiko Instruments Inc., Chiba-shi, Chiba (JP)

(72) Inventors: Tsuneaki Tamachi, Chiba (JP); Shunji Watanabe, Chiba (JP)

(73) Assignee: Seiko Instruments Inc., Chiba (JP)

( * ) Notice: Subject to any disclaimer, the term of this patent is extended or adjusted under 35 U.S.C. 154(b) by 251 days.

(21) Appl. No.: 15/402,748

(22) Filed: Jan. 10, 2017

(65) Prior Publication Data

US 2017/0207491 A1 Jul. 20, 2017

(30) Foreign Application Priority Data

Jan. 15, 2016 (JP) .................................. 2016-006391
Nov. 14, 2016 (JP) .................................. 2016-221904

(51) Int. Cl.
*H01G 11/74* (2013.01)
*H01M 2/02* (2006.01)
*H01M 2/30* (2006.01)
*H01G 11/82* (2013.01)
*H01G 11/16* (2013.01)
*H01G 11/78* (2013.01)

(52) U.S. Cl.
CPC .............. *H01G 11/74* (2013.01); *H01G 11/16* (2013.01); *H01G 11/82* (2013.01); *H01M 2/022* (2013.01); *H01M 2/026* (2013.01); *H01M 2/0277* (2013.01); *H01M 2/0285* (2013.01); *H01M 2/0287* (2013.01); *H01M 2/30* (2013.01); *H01G 11/78* (2013.01)

(58) Field of Classification Search
None
See application file for complete search history.

(56) References Cited

U.S. PATENT DOCUMENTS

2017/0033325 A1* 2/2017 Han ..................... H01M 2/0245

FOREIGN PATENT DOCUMENTS

JP 2002-298803 A 10/2002

* cited by examiner

*Primary Examiner* — Ladan Mohaddes
(74) *Attorney, Agent, or Firm* — Brinks Gilson & Lione

(57) ABSTRACT

A battery includes an electrode body including a positive electrode body and a negative electrode body and an exterior body in which the electrode body is housed. The exterior body includes a first container formed in a bottomed cylindrical shape and including a first circumferential wall section, a second container formed in a bottomed cylindrical shape and including a second circumferential wall section surrounding the first circumferential wall section, the second container housing the electrode body between the second container and the first container, and a fusing member interposed between the first circumferential wall section and the second circumferential wall section and fused to the first circumferential wall section and the second circumferential wall section.

10 Claims, 27 Drawing Sheets

ELECTROCHEMICAL CELL

RELATED APPLICATIONS

This application claims priority under 35 U.S.C. § 119 to Japanese Patent Applications No. 2016-006391 filed on Jan. 15, 2016 and No. 2016-221904 filed on Nov. 14, 2016, the entire content of which is hereby incorporated by reference.

BACKGROUND OF THE INVENTION

1. Field of the Invention

The present invention relates to an electrochemical cell.

2. Description of the Related Art

As electrochemical cells such as a nonaqueous electrolyte secondary battery and an electrical double layer capacitor, there are electrochemical cells formed in button shapes (in the following explanation, including a coin shape and a cylinder shape). The button-type electrochemical cells are used in, for example, power supplies of various devices. As one form of the button-type electrochemical cells, for example, a battery disclosed in JP-A-2002-298803 (Patent Literature 1) described below is proposed.

Patent Literature 1 discloses a configuration in which a negative electrode case made of metal functioning as a negative electrode terminal as well and a positive electrode case made of metal functioning as a positive electrode terminal as well are fit with each other via an insulating gasket. Specifically, in Patent Literature 1, the positive electrode case is fit with the negative electrode case via the insulating gasket by caulking. In an inner space defined by the positive electrode case and the negative electrode case, an electrode body is included together with a nonaqueous electrolyte.

However, when the negative electrode case and the positive electrode case are caulked, in some case, the negative electrode case and the positive electrode case are damaged by a caulking load acting on the cases during the caulking and airtightness on the inside of the battery is deteriorated. When the caulking is performed in a state in which foreign matters are held between the cases, in some case, a gap is formed between the negative electrode case and the positive electrode case by the foreign matters and the airtightness on the inside of the battery is deteriorated.

Further, when the cases are sealed from each other by the caulking, in order to mechanically increase the airtightness, it is necessary to impart strength enough for withstanding the caulking load to the negative electrode case and the positive electrode case. Therefore, the thickness of the negative electrode case and the positive electrode case increases, effective volume for housing the electrode body decreases, and energy density decreases. Therefore, in the electrochemical cells in the past, there is room of improvement in terms of improving the airtightness to improve reliability and improving the energy density.

SUMMARY OF THE INVENTION

Therefore, the present invention provides a button-type electrochemical cell having high reliability and high energy density.

According to the present invention, there is provided an electrochemical cell including: an electrode body including a positive electrode body and a negative electrode body; and an exterior body in which the electrode body is housed. The exterior body includes: a first container formed in a bottomed cylindrical shape and including a first circumferential wall section; a second container formed in a bottomed cylindrical shape and including a second circumferential wall section surrounding the first circumferential wall section, the second container housing the electrode body between the second container and the first container; and a fusing member interposed between the first circumferential wall section and the second circumferential wall section and fused to the first circumferential wall section and the second circumferential wall section.

According to the present invention, it is possible to seal the first container and the second container, in which the electrode body is housed, from each other without caulking the first container and the second container. In this case, even when scratches are present on fused surfaces with the fusing member in the circumferential wall sections or when foreign matters are held between the first circumferential wall section and the second circumferential wall section, it is possible to bury the periphery of the scratches or the foreign matters with the fusing member melted during the fusion. Consequently, compared with the configuration in which the exterior body is formed by the caulking of the first container and the second container, it is possible to improve airtightness inside the electrochemical cell.

When the exterior body is formed by the caulking of the first container and the second container, in order to impart strength enough for withstanding the caulking to the first container and the second container, it is necessary to secure the thickness of the first container and the second container equal to or larger than a predetermined value. According to the present invention, since the first container and the second container are sealed by the fusion with the fusing member, compared with the configuration in which the exterior body is formed by the caulking of the first container and the second container, it is possible to reduce the first container and the second container in thickness. Consequently, it is possible to secure large volume of the inside of the exterior body. It is possible to improve energy density of the electrochemical cell.

Therefore, it is possible to provide a button-type electrochemical call having high reliability and high energy density.

In the electrochemical cell, it is desirable that the first container is formed of a metal material, and the second container is formed of a laminate film including a metal material and a resin material.

According to the present invention, since the second container is formed of the laminate film, compared with a configuration in which the first container and the second container are formed of the metal material, it is possible to reduce the electrochemical cell in weight. Moreover, since the first circumferential wall section is formed of the metal material, in fusing the fusing member to the first circumferential wall section and the second circumferential wall section, when the second circumferential wall section surrounding the first circumferential wall section is pressed from the outer side by heating means or the like, it is possible to support the second circumferential wall section with the first circumferential wall section. Therefore, it is possible to easily manufacture the electrochemical cell in a desired external shape.

In the electrochemical cell, it is desirable that a through-hole is formed in a bottom wall section of the second container, and an electrode terminal conducting with one of the positive electrode body and the negative electrode body is inserted through the through-hole.

According to the present invention, since the electrode terminal conducting with one of the positive electrode body and the negative electrode body is inserted through the through-hole piercing through the second container, it is possible to easily conduct one of the positive electrode body and the negative electrode body to an external lead wire or the like outside of the exterior body. Therefore, in the electrochemical cell in which the laminate film is used in the exterior body, it is possible to realize a configuration for conducting the inside and the outside of the exterior body.

In the electrochemical cell, it is desirable that an inner circumferential surface of the through-hole is covered by an insulating material.

Since the second container is formed of the laminate film, the metal material is sometimes exposed to the inner circumferential surface of the through-hole. According to the present invention, since the inner circumferential surface of the through-hole is covered by the insulating material, it is possible to prevent the electrode terminal inserted through the through-hole from being short-circuited with the metal material forming the second container. It is possible to suppress the metal material forming the second container from being exposed to the outside and suppress corrosion of the metal material. Therefore, it is possible to improve reliability of the electrochemical cell.

In the electrochemical cell, it is desirable that the electrode terminal includes a flange section disposed to be opposed to an inner surface of the bottom wall section of the second container.

According to the present invention, compared with a configuration in which the electrode terminal does not include the flange section, it is possible to increase the distance of a route leading from the outside of the exterior body to the inside of the exterior body through the through-hole. Consequently, it is possible to reduce a moisture amount entering the inside of the exterior body through the through-hole. Therefore, it is possible to improve the reliability of the electrochemical cell.

In the electrochemical cell, it is desirable that the electrochemical cell includes, further on an outer side than the exterior body, an external terminal member that conducts with the electrode terminal.

According to the present invention, by forming the external terminal member from a metal material such as SUS easily joined to the external lead wire by soldering or the like, it is possible to form the electrode terminal from a material difficult to be joined by soldering or the like such as aluminum. Therefore, it is possible to easily select the material of the electrode terminal.

In the electrochemical cell, it is desirable that the electrode terminal includes a shaft section extending along an axial direction of the second container in the exterior body, and that one of the positive electrode body and the negative electrode body is conducted to the shaft section and the electrode body is wound around the shaft section.

According to the present invention, since the shaft section can be used as a winding core of the electrode body, compared with a configuration in which a winding core separate from the electrode terminal is used, it is possible to reduce the number of components. Since one of the positive electrode body and the negative electrode body is conducted to the shaft section, it is possible to conduct one of the positive electrode body and the negative electrode body and the electrode terminal without using a separate member. It is possible to reduce the number of components. Therefore, it is possible to achieve the electrochemical cell reduced in cost.

In the electrochemical cell, it is desirable that the first circumferential wall section includes an inner circumferential wall section and an outer circumferential wall section surrounding the inner circumferential wall section.

According to the present invention, compared with when the first circumferential wall section is configured by one circumferential wall section, it is possible to improve the strength of the first circumferential wall section. Consequently, compared with when the first circumferential wall section is configured by one circumferential wall section, in fusing the fusing member to the first circumferential wall section and the second circumferential wall section, it is possible to strongly press the second circumferential wall section toward the first circumferential wall section. Therefore, it is possible to surely fuse the fusing member to the first circumferential wall section and the second circumferential wall section. It is possible to improve the airtightness inside the electrochemical cell. It is possible to improve work efficiency and yield in fusing the fusing member to the first circumferential wall section and the second circumferential wall section.

In the electrochemical cell, it is desirable that the first circumferential wall section includes a connecting section that connects the inner circumferential wall section and the outer circumferential wall section over an entire circumference, and the connecting section extends along a thickness direction of the first circumferential wall section.

According to the present invention, when an external force in the thickness direction of the first circumferential wall section acts on the first circumferential wall section, it is possible to cause the connecting section to function like a rib and suppress deformation of the first circumferential wall section. Therefore, it is possible to improve the strength of the first circumferential wall section against the external force in the thickness direction of the first circumferential wall section. Consequently, in fusing the fusing member to the first circumferential wall section and the second circumferential wall section, it is possible to strongly press the second circumferential wall section toward the first circumferential wall section. Therefore, it is possible to more surely fuse the fusing member to the first circumferential wall section and the second circumferential wall section. It is possible to improve the airtightness inside the electrochemical cell. It is possible to improve the work efficiency and the yield in fusing the fusing member to the first circumferential wall section and the second circumferential wall section.

In the electrochemical cell, it is desirable that the electrode body is formed by stacking the positive electrode body and the negative electrode body, and the electrode body includes a tab projecting in a direction crossing a stacking direction with respect to a stacked portion of the positive electrode body and the negative electrode body.

According to the present invention, by drawing around the tab on the inside of the exterior body, it is possible to easily conduct the positive electrode body and the negative electrode body and other members via the tab. Therefore, it is possible to prevent structure on the inside of the exterior body from being complicated. It is possible to achieve the electrochemical cell reduced in cost.

According to the present invention, it is possible to provide an electrochemical cell having high reliability and high energy density.

DETAILED DESCRIPTION OF THE INVENTION

Embodiments of the present invention are explained below with reference to the drawings. Note that, in the following explanation, a lithium ion secondary battery (hereinafter simply referred to as "battery"), which is a type of a nonaqueous electrolyte secondary battery, is explained as an example of a button-type, coin-type, or cylinder-type electrochemical cell formed in a columnar shape.

First Embodiment

First, a battery 1 according to a first embodiment is explained.

Figure 1:
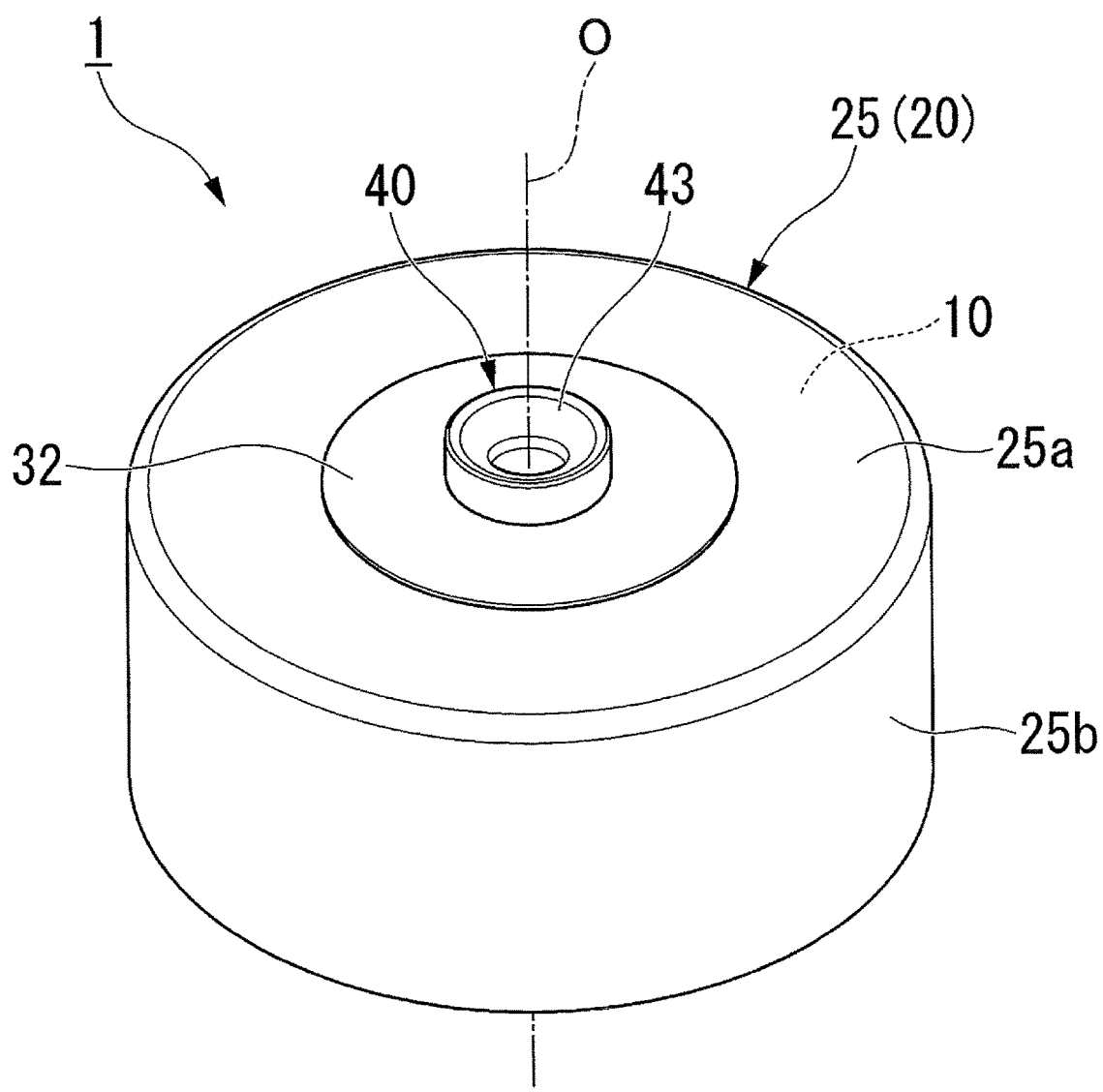
FIG. 1 is a perspective view of a battery according to a first embodiment.
Figure 2:
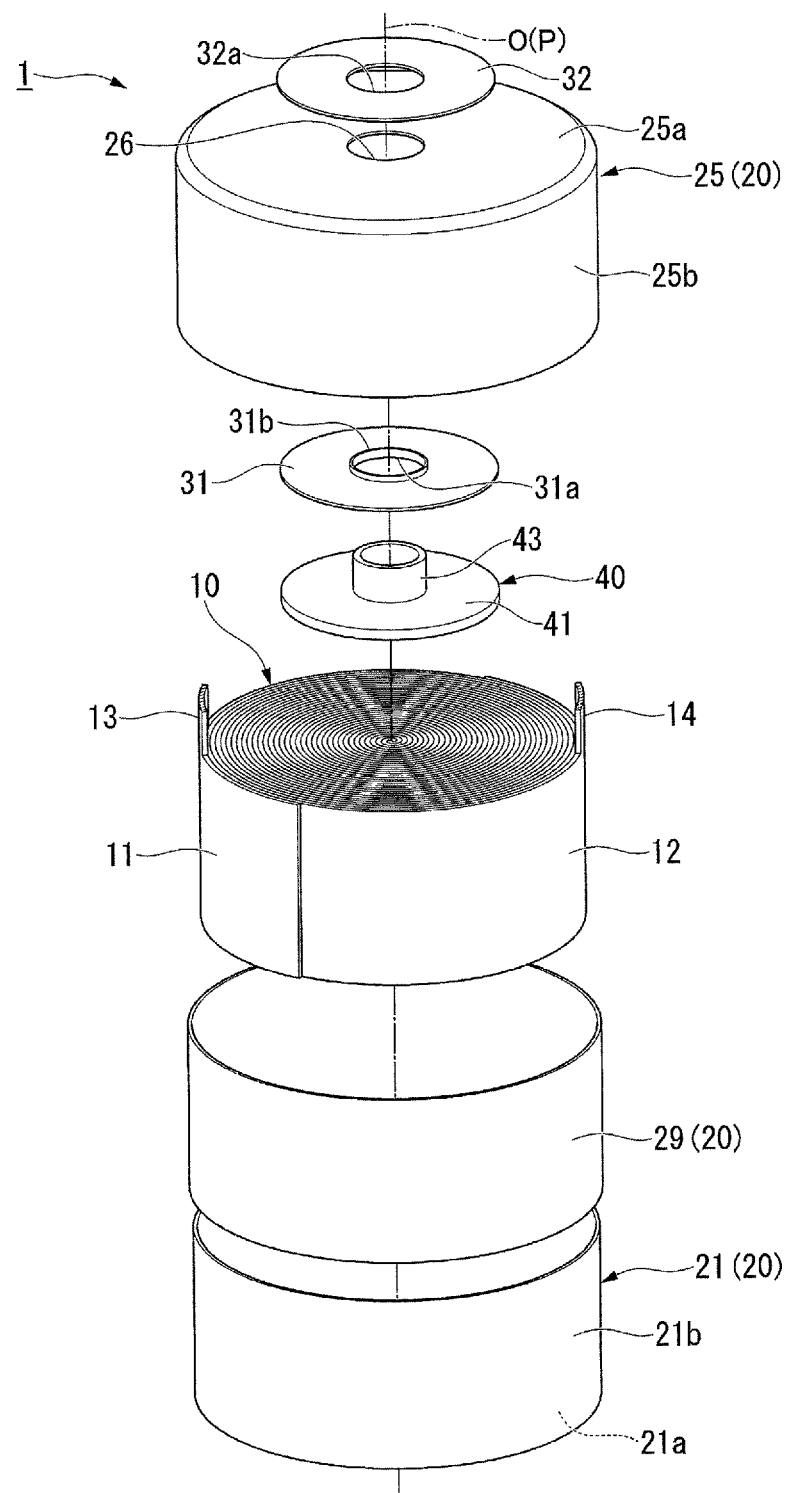
FIG. 2 is an exploded perspective view of the battery according to the first embodiment.

FIG. 1 is a perspective view of the battery 1 according to the first embodiment. FIG. 2 is an exploded perspective view of the battery 1 according to the first embodiment.

As shown in FIGS. 1 and 2, the battery 1 is a so-called button-type battery. The battery 1 mainly includes an electrode body 10 including a positive electrode body 11 and a negative electrode body 12 and an exterior body 20 in which the electrode body 10 is housed.

As shown in FIG. 2, the electrode body 10 is formed in a columnar shape by winding the positive electrode body 11 and the negative electrode body 12, both of which are belt-like, one on top of the other. Specifically, the electrode body 10 has structure in which the belt-like positive electrode body 11 and the belt-like negative electrode body 12 are wound around a winding axis P in a state in which the belt-like positive electrode body 11 and the belt-like negative electrode body 12 are stacked via a not-shown separator. Any one of the positive electrode body 11, the negative electrode body 12, and the separator may be disposed in the outermost circumference of the electrode body 10. The electrode body 10 may include, on the winding axis P, a winding core used during the winding of the positive electrode body 11 and the negative electrode body 12.

The electrode body 10 includes a positive electrode tab 13 (a tab) and a negative electrode tab 14 (a tab). The tabs 13 and 14 respectively project from the outer circumference sections of the positive electrode body 11 and the negative electrode body 12 to one side in a direction (in an example shown in the figures, the axial direction of the winding axis P) crossing a stacking direction (a direction orthogonal to the winding axis P) with respect to a stacked portion of the positive electrode body 11 and the negative electrode body 12. The positive electrode tab 13 is formed integrally with a positive electrode collector of the positive electrode body 11 and conducts with the positive electrode body 11. The negative electrode tab 14 is formed integrally with a negative electrode collector of the negative electrode body 12 and conducts with the negative electrode body 12.

Figure 3:
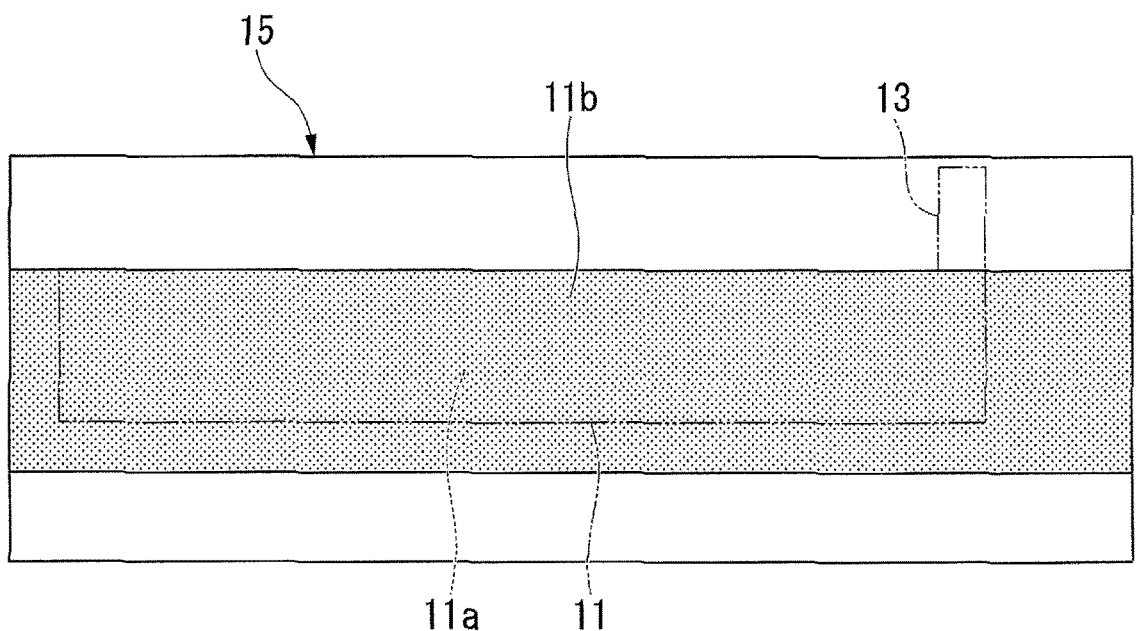
FIG. 3 is an explanatory diagram of a method of forming a positive electrode body according to the first embodiment and is a plan view of a positive electrode sheet.

FIG. 3 is an explanatory diagram of a method of forming the positive electrode body 11 according to the first embodiment and is a plan view of a positive electrode sheet.

As shown in FIG. 3, the positive electrode body 11 is formed by punching a positive electrode sheet 15 formed by disposing, at fixed width, a positive electrode 11b including a positive electrode active material on the surface of metal foil to be formed as a positive electrode collector 11a. In this case, by punching, in a belt shape, a portion where the positive electrode 11b is disposed in the positive electrode sheet 15, the positive electrode body 11 in which the positive electrode 11b is disposed on the surface of the positive electrode collector 11a is obtained. Further, by punching, together with the positive electrode body 11, a region where the positive electrode 11b is not disposed in the positive electrode sheet 15, it is possible to form the positive electrode tab 13 that projects from the positive electrode body 11 and conducts with the positive electrode collector 11a. A method of forming the negative electrode body 12 is the same as the method of forming the positive electrode body 11.

Note that, in this embodiment, the tabs 13 and 14 are respectively formed integrally with collectors. However, the tabs 13 and 14 are not limited to this. The tabs 13 and 14 may be formed separately from the collectors and respectively attached to the collectors by welding or the like. In this case, the positive electrode tab is desirably formed of a metal material such as aluminum. The negative electrode tab is desirably formed of a metal material such as SUS, nickel, or copper. In this case, it is desirable to stick insulative tapes to the surfaces of the tabs and cover the end faces of the tabs and burrs and the like caused by the welding to prevent the tabs from damaging other members. Note that, when the positive electrode tab and the negative electrode tab are formed separately from the collectors, the tabs can be formed of a material thicker than the metal foil forming the collectors. Consequently, the positive electrode tab and the negative electrode tab are less easily ruptured and reliability is improved.

As shown in FIG. 2, the exterior body 20 includes a first container 21 having a bottomed cylindrical shape, a second container 25 having a bottomed cylindrical shape, and a cylindrical fusing member 29. The first container 21, the second container 25, and the fusing member 29 are disposed such that the center axes thereof are coaxial. In the following explanation, the center axis of the first container 21, the second container 25 and the fusing member 29 is represented as a center axis O. A direction along the center axis O is referred to as an axial direction, a direction orthogonal to the center axis O is referred to as a radial direction, and a direction of turning around the center axis O is referred to as a circumferential direction. In the following explanation, in some case, in the axial direction, a direction toward the center of the battery 1 is referred to as inner side and a direction away from the center of the battery 1 (a direction toward the first container 21 and the second container 25) is referred to as outer side.

The first container 21 is formed of a metal material having conductivity. As the material forming the first container 21, for example, clad materials made of SUS, iron, and nickel can be used. The SUS is more suitable because the SUS is excellent in durability.

The first container 21 includes a first bottom wall section 21a and a first circumferential wall section 21b. The first container 21 is opened to the second container 25 side in the axial direction. The dimension of the first container 21 is set to a degree for enabling the electrode body 10 to be disposed on the inner side such that the winding axis P is coaxial with the center axis O. The negative electrode tab 14 is connected to the inner surface of the first container 21 by welding or the like. Consequently, the first container 21 functions as a negative electrode terminal of the battery 1.

The second container 25 is formed of a laminate film. The laminate film is formed by stacking metal foil, a fusing layer made of resin forming the inner side surface in the second container 25, and a protective layer made of resin forming the outer side surface in the second container 25. The fusing layer is formed using, for example, thermoplastic resin such as polyethylene or polypropylene of polyolefin. As the polyolefin, materials described below can be selected as appropriate. As the polyolefin, for example, any one of high-pressure-processed low density polyethylene (LDPE), low-pressure-processed high density polyethylene (HDPE), an inflation polypropylene (IPP) film, a non-stretched polypropylene (CPP) film, a biaxially-stretched polypropylene (OPP) film, and linear short-chain branched polyethylene (L-LDPE, metallocene specifications) can be used. The protective layer is formed using, for example, the polyolefin, polyester such as polyethylene terephthalate, or nylon. The fusing layer and the protective layer are respectively joined to the metal foil by thermal fusing or an adhesive via joining layers.

The second container 25 includes a second bottom wall section 25a and a second circumferential wall section 25b. The second container 25 is formed such that a dimension in the axial direction is equal to the dimension of the first container 21. The inner diameter of the second circumferential wall section 25b is set to a degree slightly larger than the outer diameter of the first circumferential wall section 21b of the first container 21. The second container 25 is opened to the first container 21 side in the axial direction. That is, the second container 25 houses the first container 21 in a state in which the opening sections of the second container 25 and the first container 21 are opposed to each other in the axial direction. The second circumferential wall section 25b surrounds the first circumferential wall section 21b. Between the first container 21 and the second container 25 (i.e., on the inside of the exterior body 20), a housing section, in which the electrode body 10 is housed, is defined by the first bottom wall section 21a, the first circumferential wall section 21b, and the second bottom wall section 25a.

A through-hole 26 is formed in the second bottom wall section 25a of the second container 25. The through-hole 26 is formed coaxially with the center axis O.

Ring films 31 and 32 formed in an annular shape are disposed on both the surfaces of the second bottom wall section 25a. The ring films 31 and 32 are formed of an insulating material. As the insulating material forming the ring films 31 and 32, thermoplastic resin such as polyethylene or polypropylene can be used.

The first ring film 31 is disposed on the inner surface of the second bottom wall section 25a. In the first ring film 31, a first film through-hole 31a coaxial with the through-hole 26 is formed. The first ring film 31 includes an annular wall section 31b extending from the inner circumferential edge of the first ring film 31 toward the outer side in the axial direction. The outer diameter of the wall section 31b is equivalent to the inner diameter of the through-hole 26. The wall section 31b is located in the through-hole 26.

The first ring film 31 is thermally fused to the inner surface of the second bottom wall section 25a and covers the circumference of the through-hole 26 of the second bottom wall section 25a from the inner side in the axial direction. The wall section 31b covers the inner circumferential surface of the through-hole 26 in the through-hole 26.

The second ring film 32 is disposed on the outer surface of the second bottom wall section 25a. In the second ring film 32, a second film through-hole 32a coaxial with the through-hole 26 is formed. The inner diameter of the second film through-hole 32a is, for example, equivalent to the inner diameter of the through-hole 26. The second ring film 32 is thermally fused to the outer surface of the second bottom wall section 25a and covers the circumference of the through-hole 26 in the second bottom wall section 25a from the outer side in the axial direction.

In the second bottom wall section 25a, an electrode terminal 40 for connecting the positive electrode body 11 and an external lead wire or the like is provided. That is, the electrode terminal 40 functions as a positive electrode terminal of the battery 1. The electrode terminal 40 is formed of a metal material such as aluminum or an aluminum alloy. The electrode terminal 40 includes a flange section 41 disposed to be opposed to the inner surface of the second bottom wall section 25a in the axial direction and a drawing-out section 43 extending from the center of the flange section 41 to the outer side in the axial direction.

The flange section 41 is disposed coaxially with the center axis O. The outer diameter of the flange section 41 is set smaller than the inner diameter of the first circumferential wall section 21b of the first container 21. The flange section 41 is thermally fused to the second bottom wall section 25a in a state in which the first ring film 31 is held between the flange section 41 and the second bottom wall section 25a.

The positive electrode tab 13 is electrically connected to the flange section 41 and more desirably connected to the flange section 41 by welding or the like. Note that, as the welding of the flange section 41 and the positive electrode tab 13, for example, ultrasonic welding, laser welding or resistance welding can be applied. An electronically conductive material may be interposed between the flange section 41 and the positive electrode tab 13 in order to assist electric connection. In that case, the flange section 41 and the positive electrode tab 13 may be connected by interposing a conductive paste between the flange section 41 and the positive electrode tab 13. In order to electrically connect the flange section 41 and the positive electrode tab 13, a physical method such as caulking or press-contact can be applied.

The drawing-out section 43 is formed in a cylindrical shape. The drawing-out section 43 is inserted through the through-hole 26 of the second bottom wall section 25a. The drawing-out section 43 is caulked on the outer side of the exterior body 20 (see FIG. 1) and holds the second bottom wall section 25a and the ring films 31 and 32 between the drawing-out section 43 and the flange section 41.

The fusing member 29 is interposed between the first circumferential wall section 21b of the first container 21 and the second circumferential wall section 25b of the second container 25. The fusing member 29 is formed of thermoplastic resin such as polyethylene or polypropylene. The fusing member 29 may be formed in a single layer or may be formed by stacking a plurality of resin materials. The fusing member 29 is thermally fused to the first circumferential wall section 21b and the second circumferential wall section 25b. Consequently, the inside (the housing section) of the exterior body 20 is sealed from the outside of the exterior body 20.

Figure 4:
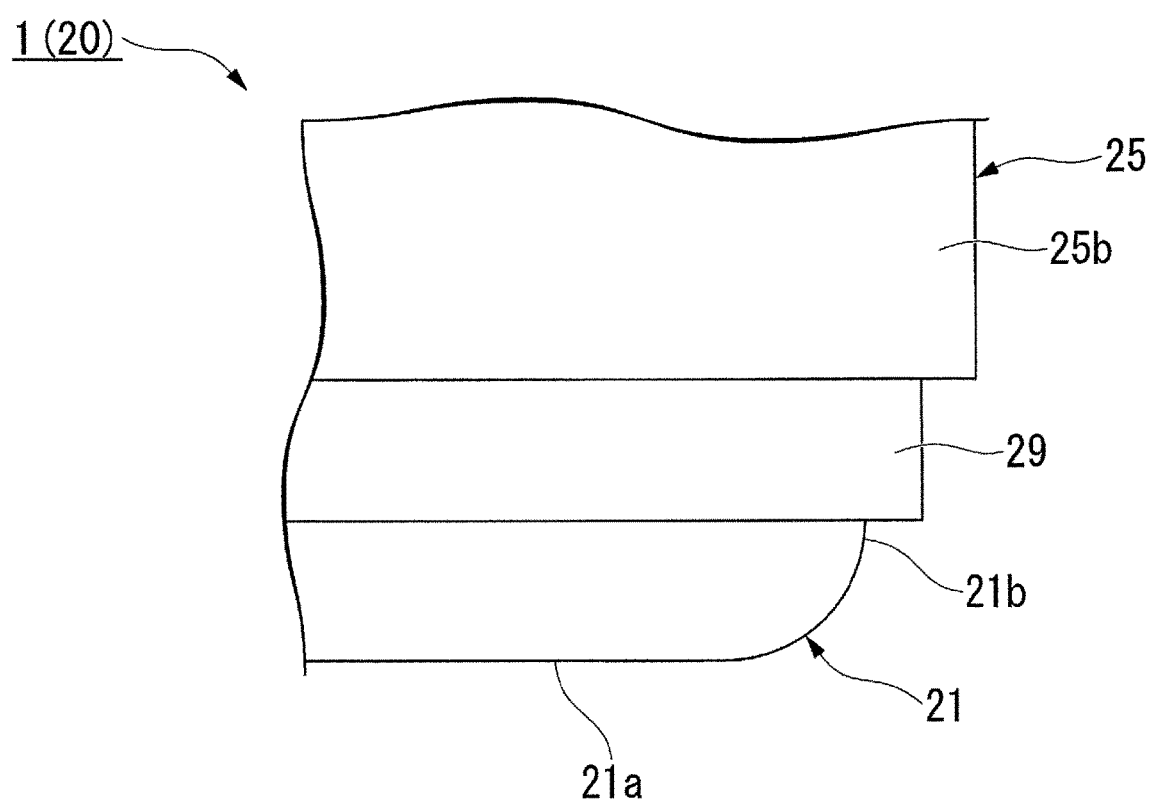
FIG. 4 is an enlarged side view near an opening section of a second container according to the first embodiment.

FIG. 4 is an enlarged side view near the opening section of the second container 25 according to the first embodiment.

As shown in FIG. 4, the fusing member 29 is disposed such that a part of the fusing member 29 is located further on the outer side than the opening end edge of the second circumferential wall section 25b of the second container 25. In this case, the fusing member 29 may cover the opening end face of the second circumferential wall section 25b through melting during thermal fusing. Consequently, it is possible to prevent the metal foil forming the laminate film of the second container 25 and the first container 21 from being short-circuited.

A method of forming the exterior body 20 is explained below with reference to FIG. 2.

First, the electrode terminal 40 is assembled to the second container 25. Specifically, in a state in which the ring films 31 and 32 and the electrode terminal 40 are disposed in predetermined positions, the ring films 31 and 32 are heated and melted. Consequently, the electrode terminal 40 is thermally fused to the second container 25 via the ring films 31 and 32. Subsequently, the drawing-out section 43 is caulked.

Subsequently, the electrode body 10 is housed on the inner side of the first container 21. The second container 25 is assembled to the first container 21. Specifically, in a state in which the fusing member 29 is disposed between the first circumferential wall section 21b and the second circumferential wall section 25b, the fusing member 29 is heated and melted to thermally fuse the fusing member 29 to the first circumferential wall section 21b and the second circumferential wall section 25b.

Figure 5:
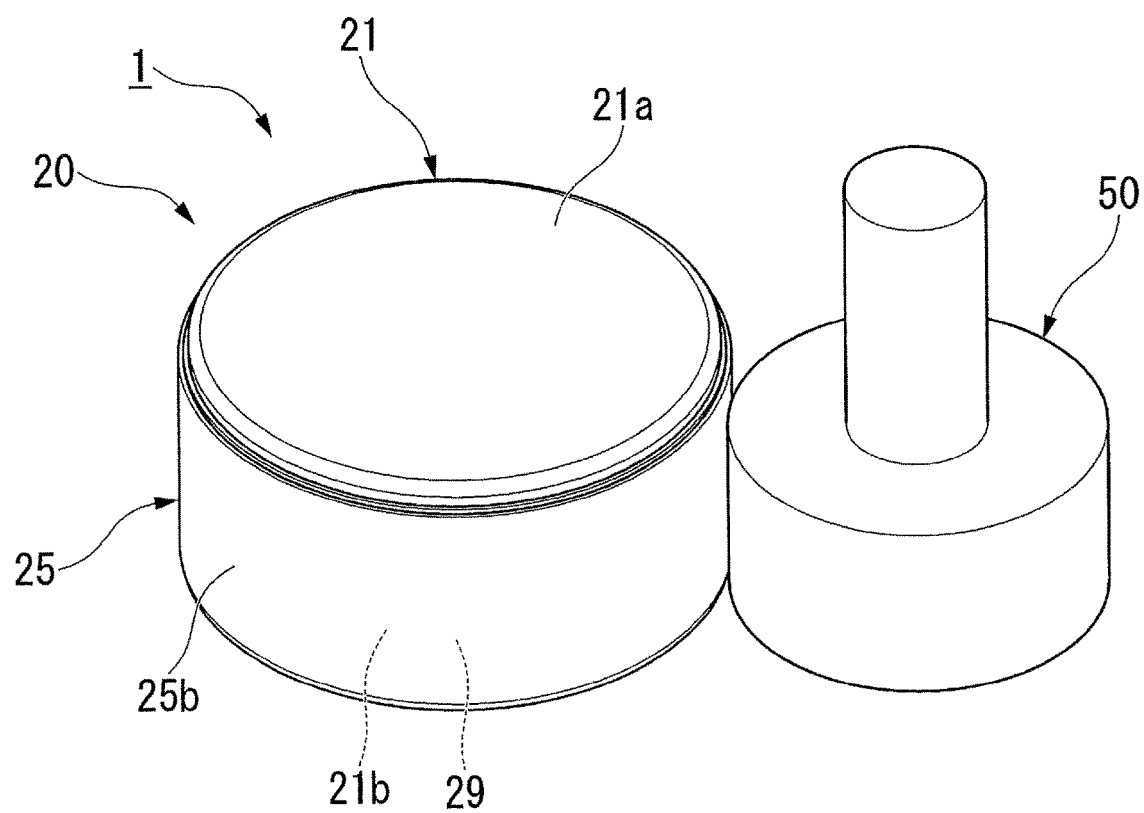
FIG. 5 is a perspective view for explaining a method of forming an exterior body according to the first embodiment.

FIG. 5 is a perspective view for explaining the method of forming the exterior body 20 according to the first embodiment.

As shown in FIG. 5, the thermal fusing of the first circumferential wall section 21b and the second circumferential wall section 25b can be performed by pressing a heating object of metal, ceramics, or the like against the first circumferential wall section 21b and the second circumferential wall section 25b. More desirably, the thermal fusing is performed using a heating roll 50 having a roll shape. Specifically, the heating roll 50 heated to temperature capable of melting the fusing member 29 is pressed against the second circumferential wall section 25b from the outer side in the radial direction to melt the fusing member 29. Thereafter, when the fusing member 29 is cooled, the fusing member 29 is thermally fused to the first circumferential wall section 21b and the second circumferential wall section 25b. At this point, the fusing member 29 can be thermally fused by sequentially or simultaneously pressing a plurality of heating objects against the second circumferential wall section 25b. The heating roll 50 is formed of a metal material having high thermal conductivity. For example, brass and aluminum can be used. On the surface of the heating roll 50, for example, a tape of fluorine-based resin, silicone-based resin, or polyimide resin may be disposed to prevent adhesion of the heated second circumferential wall section 25b.

Note that the fusing member 29 may be set in a state in which the fusing member 29 is thermally fused to the first container 21 in advance. In this case, after the fusing member 29 is disposed to surround the first circumferential wall section 21b, the fusing member 29 can be thermally fused to the first circumferential wall section 21b by pressing the heated heating roll 50 against the fusing member 29. The adhesion of the fusing member 29 can be improved by applying degrease cleaning to the first circumferential wall section 21b and applying primer treatment to the fusing member 29 in advance.

In this way, in this embodiment, the fusing member 29 is interposed between the first circumferential wall section 21b of the first container 21 having the bottomed cylindrical shape and the second circumferential wall section 25b of the second container 25 having the bottomed cylindrical shape. The fusing member 29 is fused to the first circumferential wall section 21b and the second circumferential wall section 25b.

With this configuration, it is possible to seal the first container 21 and the second container 25, in which the electrode body 10 is housed, from each other without caulking the first container 21 and the second container 25. In this case, even when scratches are present on fused surfaces with the fusing member 29 in the circumferential wall sections 21b and 25b or when foreign matters are held between the first circumferential wall section 21b and the second circumferential wall section 25b, it is possible to bury the periphery of the scratches or the foreign matters with the fusing member 29 melted during the thermal fusion. Consequently, compared with the configuration in which the exterior body is formed by the caulking of the first container and the second container, it is possible to improve airtightness inside the battery 1.

When the exterior body is formed by the caulking of the first container and the second container, in order to impart strength enough for withstanding the caulking to the first container and the second container, it is necessary to secure the thickness of the first container and the second container equal to or larger than a predetermined value. According to this embodiment, since the first container 21 and the second container 25 are sealed by the thermal fusion with the fusing member 29, compared with the configuration in which the exterior body is formed by the caulking of the first container and the second container, it is possible to reduce the first container 21 and the second container 25 in thickness. Consequently, it is possible to secure large volume of the inside of the exterior body 20. It is possible to improve energy density of the battery 1.

Therefore, it is possible to provide the button-type battery 1 having high reliability and high energy density.

Since the second container 25 is formed of the laminate film, compared with a configuration in which the first container and the second container are formed of the metal material, it is possible to reduce the battery 1 in weight. Moreover, since the first circumferential wall section 21b is formed of the metal material, in thermally fusing the fusing member 29 to the first circumferential wall section 21b and the second circumferential wall section 25b, when the second circumferential wall section 25b surrounding the first circumferential wall section 21b is pressed from the outer side by the heating roll 50, it is possible to support the second circumferential wall section 25b with the first circumferential wall section 21b. Therefore, it is possible to easily manufacture the battery 1 in a desired external shape.

Since the electrode terminal 40 conducting with the positive electrode body 11 is inserted through the through-hole 26 piercing through the second container 25, it is possible to easily conduct the positive electrode body 11 to the external lead wire or the like outside of the exterior body 20. Therefore, in the battery 1 in which the laminate film is used in the exterior body 20 (the second container 25), it is possible to realize a configuration for conducting the inside and the outside of the exterior body 20.

Since the second container 25 is formed of the laminate film, the metal material (the metal foil) is sometimes exposed to the inner circumferential surface of the through-hole 26. According to this embodiment, since the inner circumferential surface of the through-hole 26 is covered by the first ring film 31 made of the insulating material, it is possible to prevent the electrode terminal 40 inserted through the through-hole 26 from being short-circuited with the metal foil forming the second container 25. It is possible to suppress the metal foil forming the second container 25 from being exposed to the outside and suppress corrosion of the metal foil. Therefore, it is possible to improve reliability of the battery 1. The material of the ring films 31 and 32 may be resin of a single material. However, more desirably, a material obtained by forming two or more kinds of resin in a layered shape can be used. In particular, non-woven fabric of olefin-based resin can be used as one kind of the layered resin.

Since the electrode terminal 40 includes the flange section 41 disposed to be opposed to the inner surface of the second bottom wall section 25a, compared with a configuration in which the electrode terminal does not include the flange section, it is possible to increase the distance of a route leading from the outside of the exterior body 20 to the inside of the exterior body 20 through the through-hole 26. Consequently, it is possible to reduce a moisture amount entering the inside of the exterior body 20 through the through-hole 26. Therefore, it is possible to improve the reliability of the battery 1.

Since the electrode body 10 includes the tabs 13 and 14, by drawing around the tabs 13 and 14 on the inside of the exterior body 20, it is possible to easily conduct the positive electrode body 11 and the negative electrode body 12 and other members (e.g., the electrode terminal 40 and the first container 21) via the tabs 13 and 14. Therefore, it is possible to prevent structure on the inside of the exterior body 20 from being complicated. It is possible to achieve the battery 1 reduced in cost.

Note that, in the first embodiment, the negative electrode body 12 and the first container 21 are conducted via the negative electrode tab 14. However, the negative electrode body 12 and the first container 21 are not limited to this. The negative electrode body 12 and the inner surface of the first container 21 may be conducted by, for example, disposing a negative electrode collector of the negative electrode body 12 in the outermost circumference of the electrode body 10.

In the first embodiment, the positive electrode tab 13 and the negative electrode tab 14 project from the outer circumference sections of the positive electrode body 11 and the negative electrode body 12. However, the positive electrode tab 13 and the negative electrode tab 14 are not limited to this.

Figure 6:
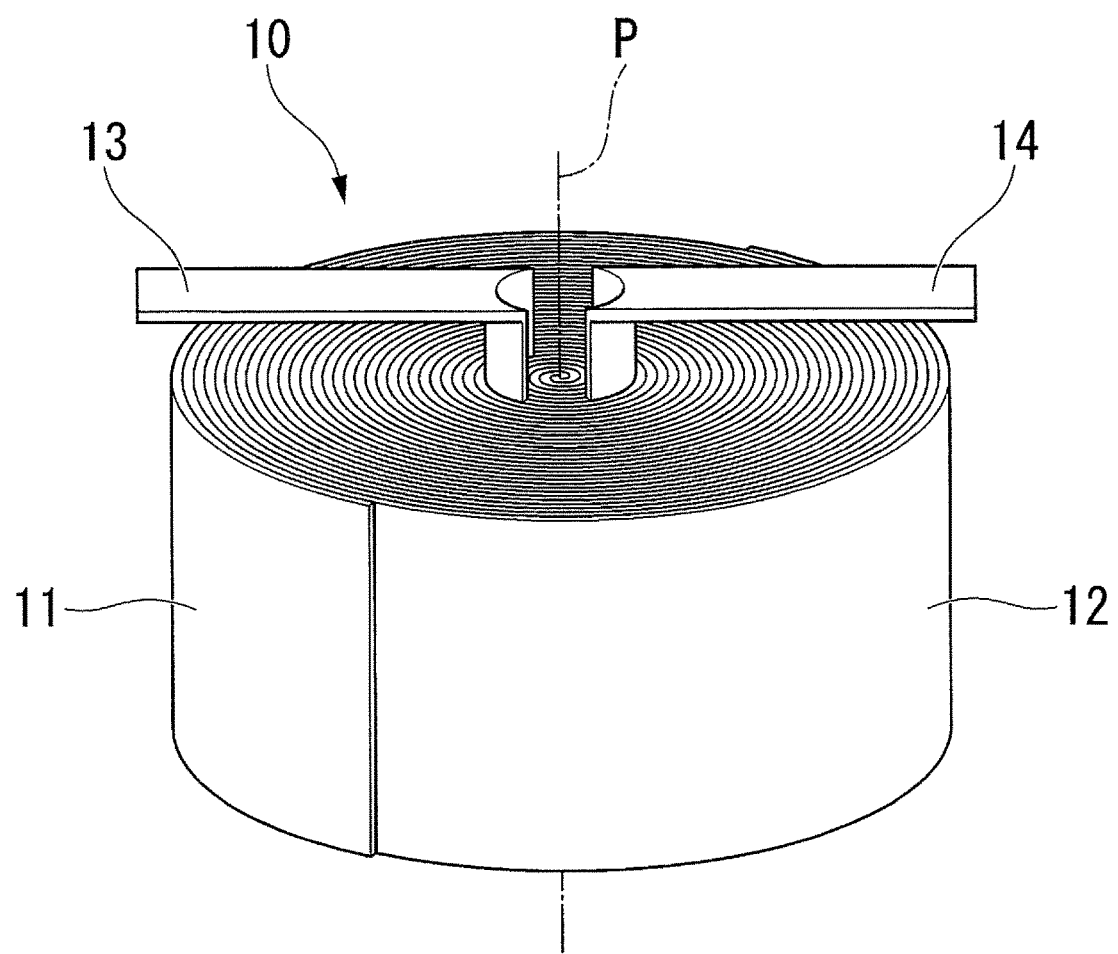
FIG. 6 is a perspective view of an electrode body according to a first modification of the first embodiment.
Figure 7:
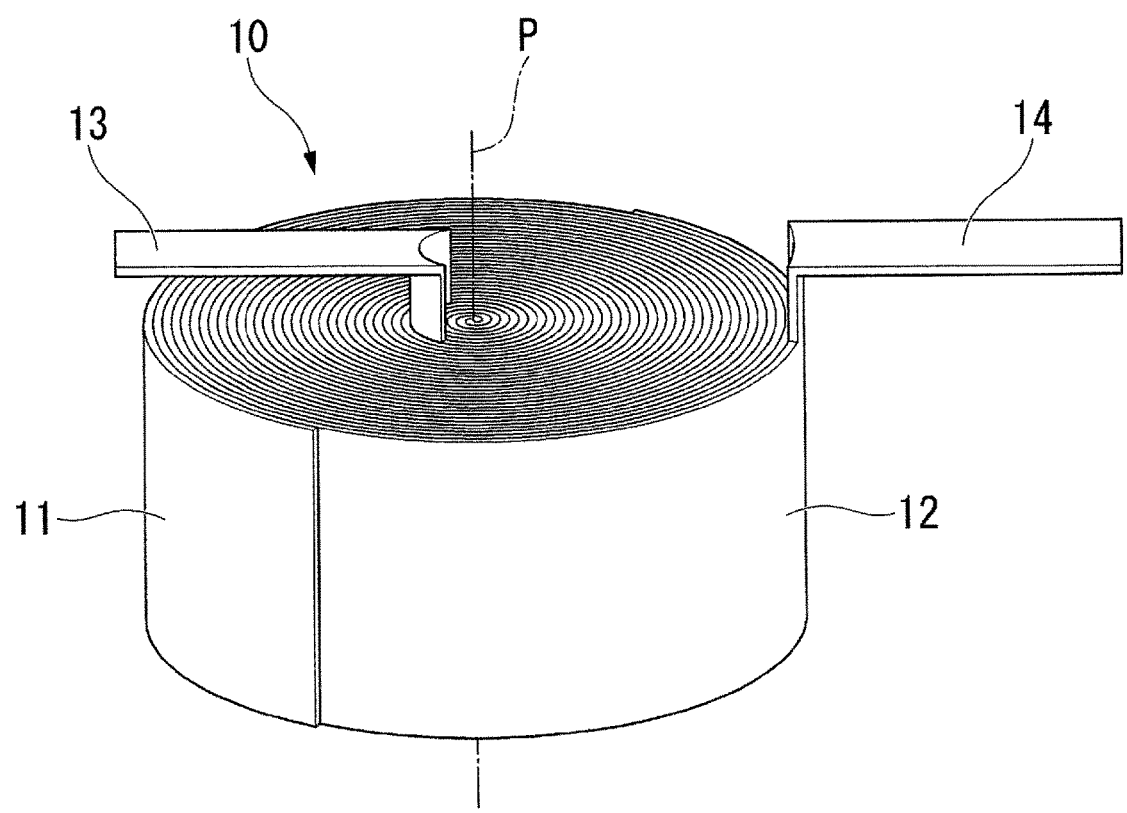
FIG. 7 is a perspective view of an electrode body according to a second modification of the first embodiment.

FIG. 6 is a perspective view of an electrode body according to a first modification of the first embodiment. FIG. 7 is a perspective view of an electrode body according to a second modification of the first embodiment.

As shown in FIG. 6, the positive electrode tab 13 and the negative electrode tab 14 may project from the inner circumferential sections of the positive electrode body 11 and the negative electrode body 12. As shown in FIG. 7, one of the positive electrode tab 13 and the negative electrode tab 14 (in an example shown in the figure, the positive electrode tab 13) may project from the inner circumferential section and the other may project from the outer circumferential section.

In the first embodiment and the first modification and the second modification of the first embodiment, the positive electrode tab 13 and the negative electrode tab 14 project in the same direction from the stacked portion of the positive electrode body 11 and the negative electrode body 12. However, the positive electrode tab 13 and the negative electrode tab 14 may respectively project in directions different from each other (e.g., one side and the other side of the axial direction of the winding axis P) from the stacked portion of the positive electrode body 11 and the negative electrode body 12.

After projecting from the stacked portion of the positive electrode body 11 and the negative electrode body 12 along the axial direction of the winding axis P, the positive electrode tab 13 and the negative electrode tab 14 may be bend in any direction.

The modifications explained above may be combined as appropriate. For example, one of the positive electrode tab 13 and the negative electrode tab 14 may project from the inner circumferential sections of the positive electrode body 11 and the negative electrode body 12 to one side in the axial direction of the winding axis P and may be bent toward the outer side in the radial direction. The other may project from the outer circumferential sections of the positive electrode body 11 and the negative electrode body 12 to the other side in the axial direction of the winding axis P and may be bent toward the inner side in the radial direction. One of the positive electrode tab 13 and the negative electrode tab 14 may project from the inner circumferential sections of the positive electrode body 11 and the negative electrode body 12 to one side in the axial direction of the winding axis P and may be bent toward the inner side in the radial direction. The other may project from the inner circumferential sections of the positive electrode body 11 and the negative electrode body 12 toward the other side in the axial direction of the winding axis P and may be bent toward the inner side in the radial direction.

In this way, the positive electrode tab 13 and the negative electrode tab 14 are bent toward the inner side in the radial direction. Therefore, it is possible to easily form, without reducing the positive electrode tab 13 and the negative electrode tab 14 in length, the positive electrode tab 13 and the negative electrode tab 14 in a shape not projecting from the stacked portion of the positive electrode body 11 and the negative electrode body 12 when viewed from the axial direction of the winding axis P.

Figure 8:
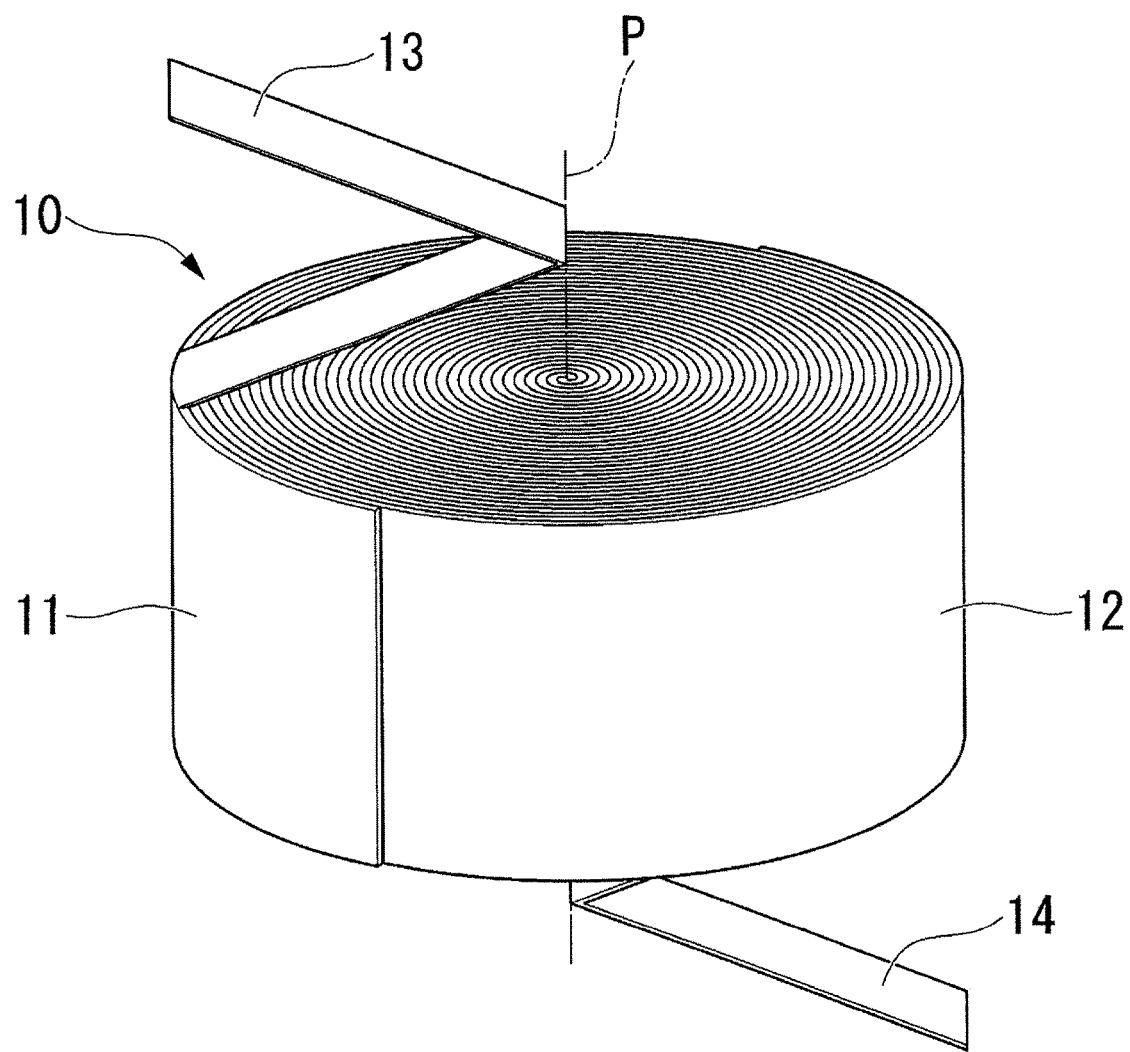
FIG. 8 is a perspective view of an electrode body according to a third modification of the first embodiment.

FIG. 8 is a perspective view of an electrode body according to a third modification of the first embodiment.

As shown in FIG. 8, each of the positive electrode tab 13 and the negative electrode tab 14 may be bent a plurality of times. Specifically, the positive electrode tab 13 projects from the outer circumferential sections of the positive electrode body 11 and the negative electrode body 12 to one side in the axial direction of the winding axis P. The positive electrode tab 13 is bent toward the inner side in the radial direction in the proximal end portion and bent toward the outer side in the radial direction in the intermediate portion. The negative electrode tab 14 projects from the outer circumferential sections of the positive electrode body 11 and the negative electrode body 12 to the other side in the axial direction of the winding axis P. The negative electrode tab 14 is bent toward the inner side in the radial direction in the proximal end portion and bent toward the outer side in the radial direction in the intermediate portion in the extending direction.

A plurality of the positive electrode tabs 13 may be formed and connected to one another by welding or the like. The same applies to the negative electrode tab 14.

In the first embodiment, the drawing-out section 43 of the electrode terminal 40 is formed in the cylindrical shape. However, the drawing-out section 43 is not limited to this.

Figure 9:
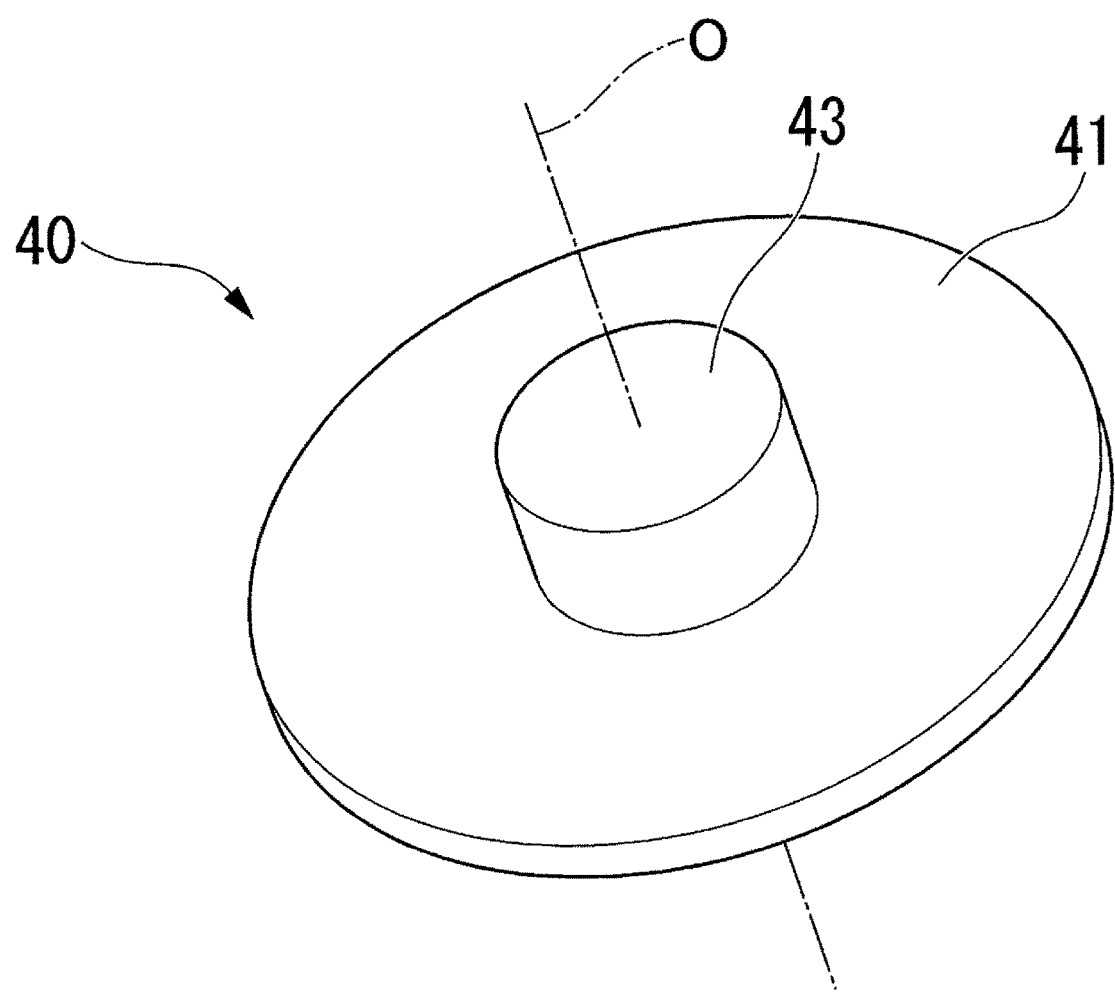
FIG. 9 is a perspective view of an electrode terminal according to a fourth modification of the first embodiment.
Figure 10:
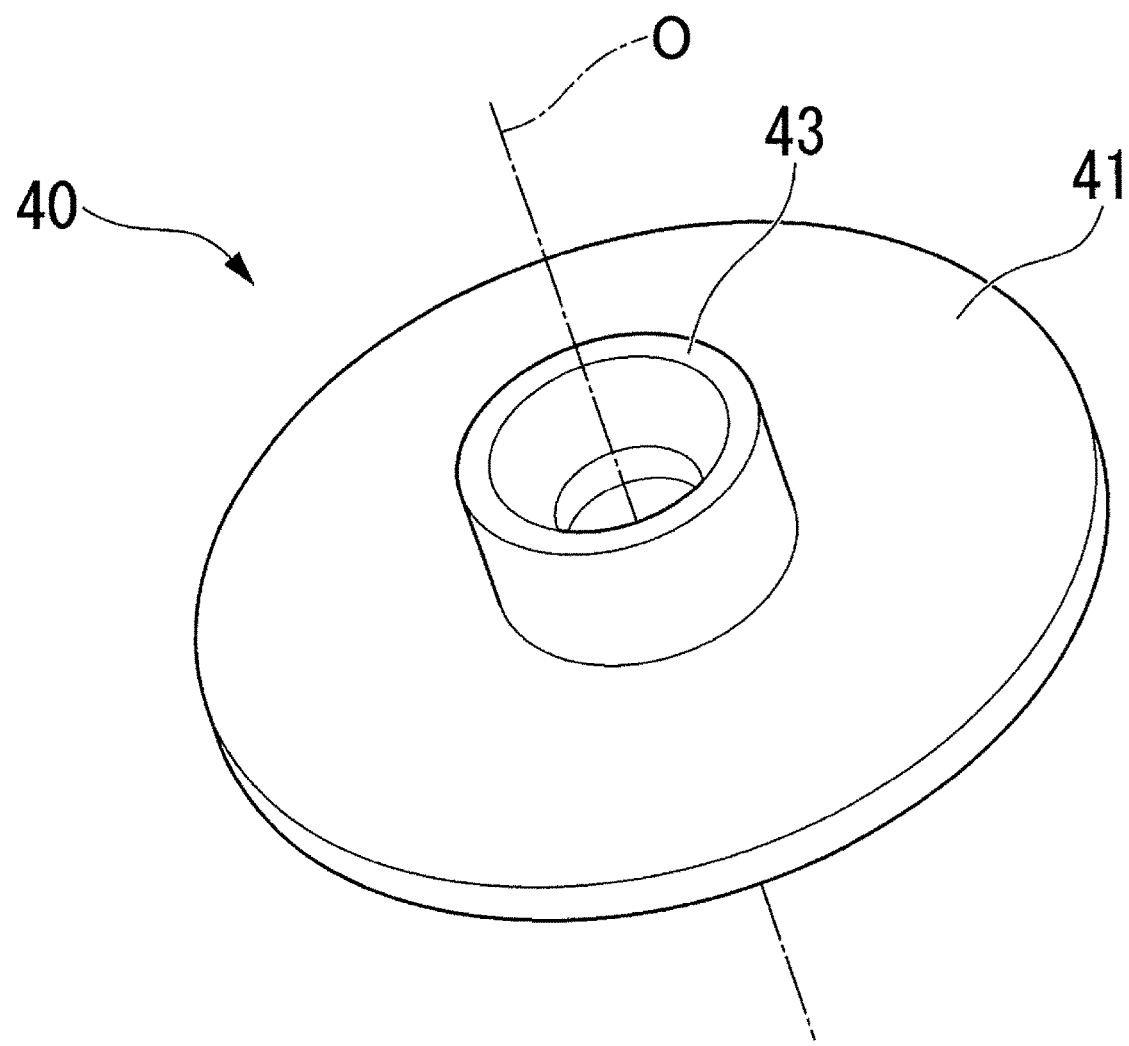
FIG. 10 is a perspective view of an electrode terminal according to a fifth modification of the first embodiment.
Figure 11:
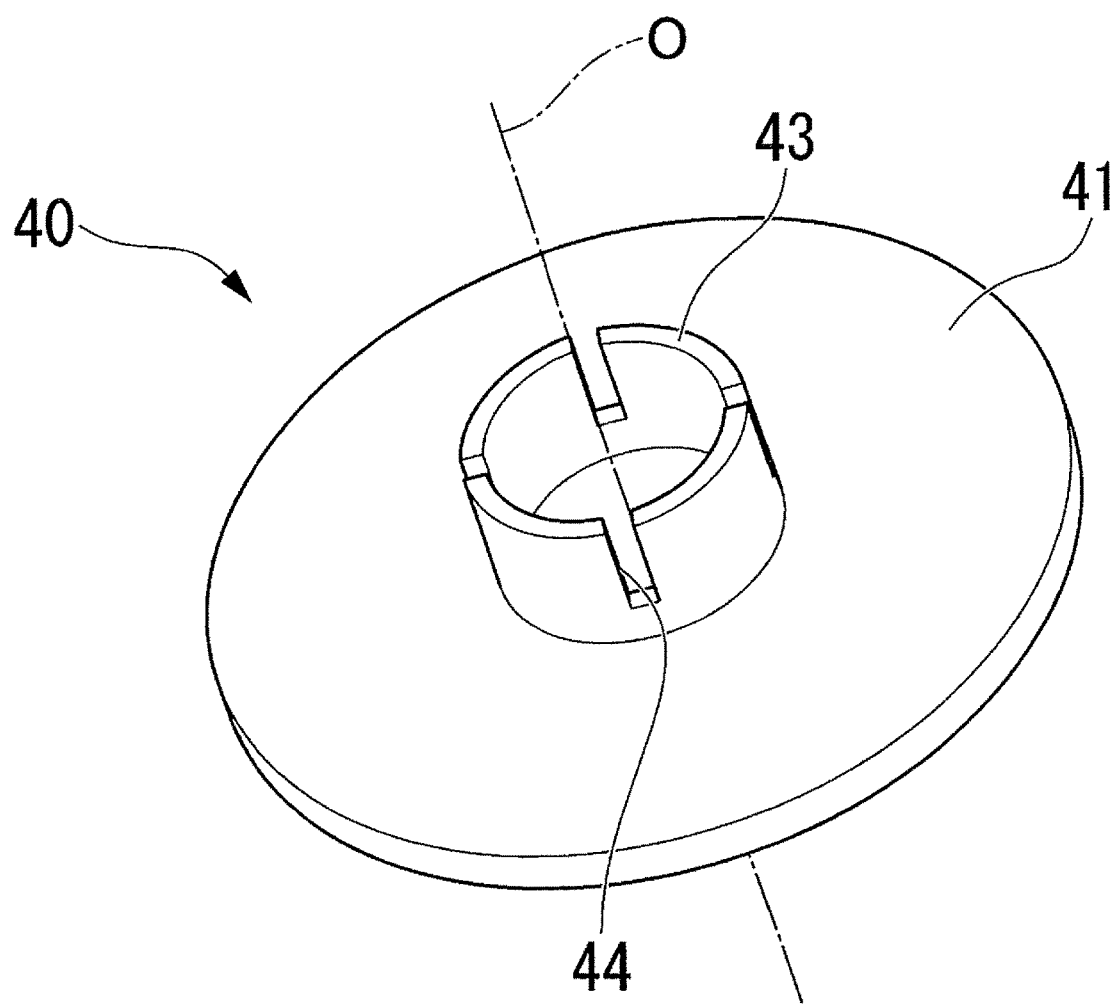
FIG. 11 is a perspective view of an electrode terminal according to a sixth modification of the first embodiment.

FIG. 9 is a perspective view of an electrode terminal according to a fourth modification of the first embodiment. FIG. 10 is a perspective view of an electrode terminal according to a fifth modification of the first embodiment. FIG. 11 is a perspective view of an electrode terminal according to a sixth modification of the first embodiment.

As shown in FIG. 9, the drawing-out section 43 may be formed in a columnar shape. As shown in FIG. 10, the drawing-out section 43 may be formed in a cylindrical shape. The inner circumferential surface on the opening section side may be formed in a taper shape gradually expanded in diameter from the inner side toward the outer side in the axial direction. As shown in FIG. 11, a plurality of slits 44 may be formed in the drawing-out section 43.

Figure 12:
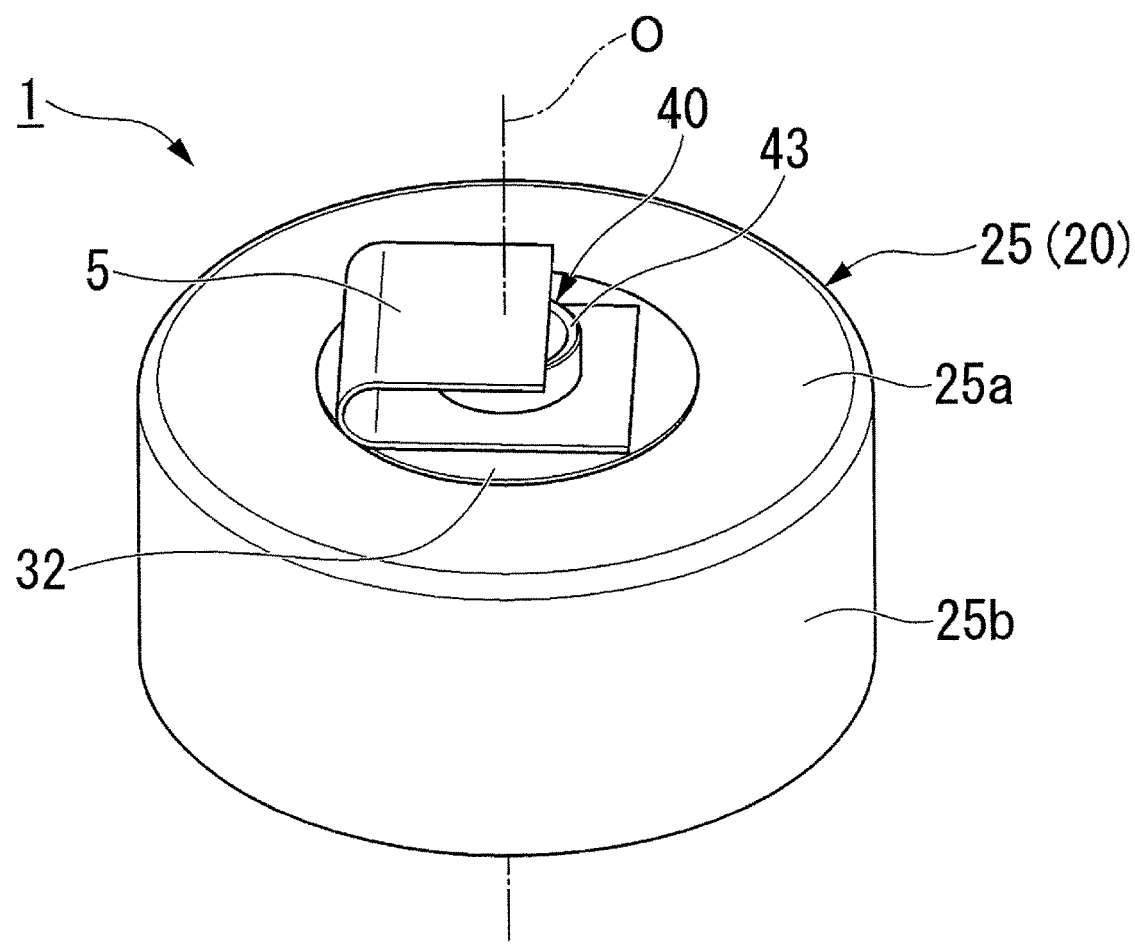
FIG. 12 is a perspective view of a battery according to a seventh modification of the first embodiment.

FIG. 12 is a perspective view of a battery according to a seventh modification of the first embodiment.

As shown in FIG. 12, the battery 1 may include an external terminal member 5. The external terminal member 5 is formed in a long rectangular plate shape from a metal material such as SUS, nickel, or copper applied with nickel plating. An insert-through hole, through which the drawing-out section 43 of the electrode terminal 40 is inserted, is formed at one end portion in the extending direction in the external terminal member 5. The external terminal member 5 is held between the caulked drawing-out section 43 and the second ring film 32 in a state in which the drawing-out section 43 is inserted through the insert-through hole. Further, the external terminal member 5 is curved in a U shape such that the other end portion in the extending direction covers the distal end of the drawing-out section 43. The other end portion and the drawing-out section 43 are connected by welding or the like.

With this configuration, by forming the external terminal member 5 from the metal material such as SUS easily joined to the external lead wire by soldering or the like, it is possible to form the electrode terminal 40 from a material difficult to be joined by soldering or the like such as aluminum. In an example shown n FIG. 12, the external terminal member 5 is formed in the U shape. However, the external terminal member 5 may be formed in a flat plate shape or an L shape. Other than using the external terminal member 5 for the soldering or the like to the external lead wire, the battery 1 may be directly joined to a circuit board of an apparatus at a power supply destination via the external terminal member 5. The external terminal member 5 can be screwed to a terminal, the circuit board or the like of the apparatus at the power supply destination. Therefore, it is possible to easily select the material of the electrode terminal 40.

Further, the electrode terminal 40 can be threaded to screw the external terminal member 5. Consequently, it is possible to improve workability in battery replacement in an apparatus in which a battery is used.

Figure 13:
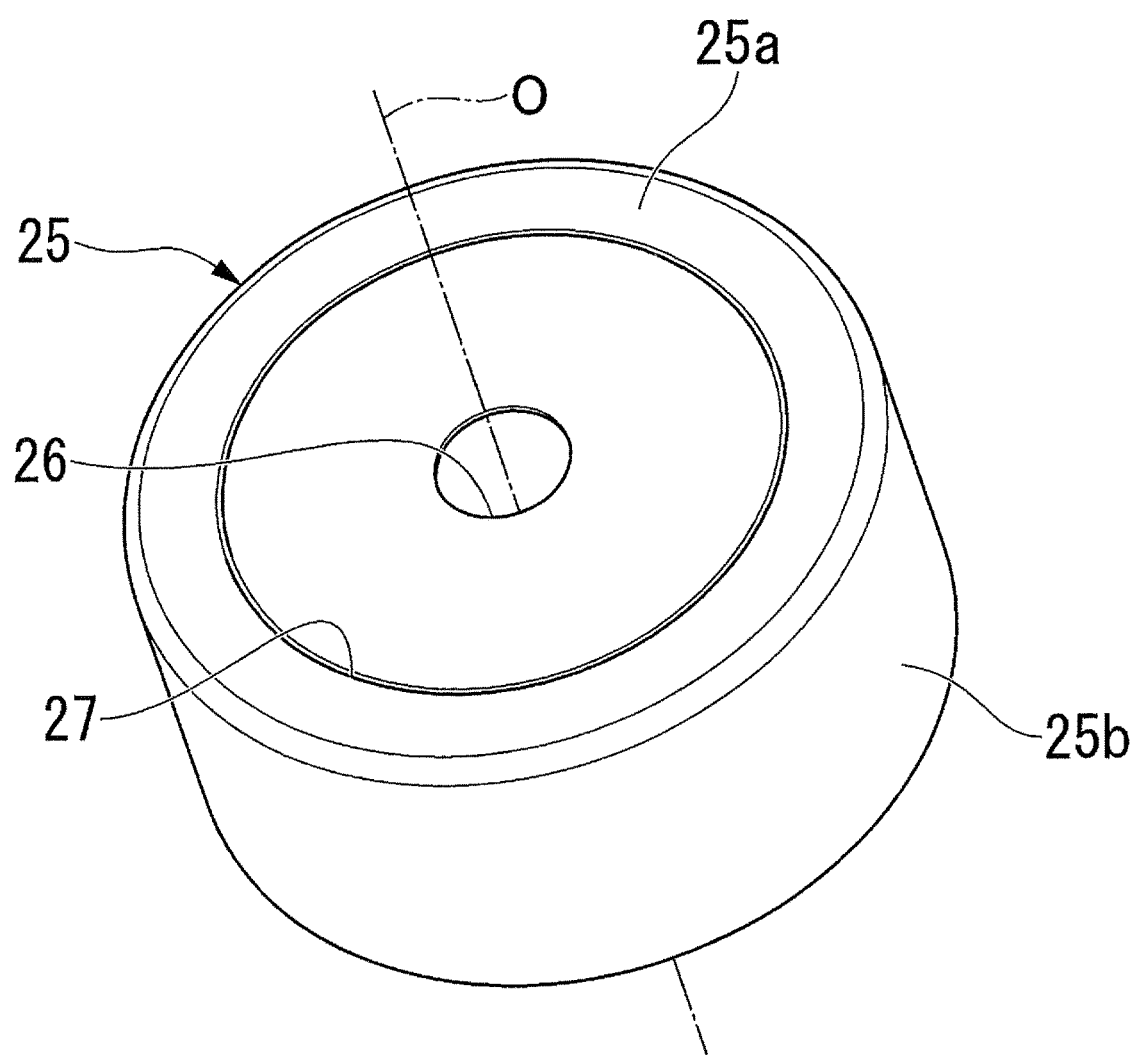
FIG. 13 is a perspective view of a second container according to an eighth modification of the first embodiment.

FIG. 13 is a perspective view of a second container according to an eighth modification of the first embodiment.

As shown in FIG. 13, a groove-like weakened section 27 may be formed in the second container 25. In an example shown in the figure, the weakened section 27 is formed in an annular shape to be coaxial with the center axis O on the outer surface of the second bottom wall section 25a.

By providing the weakened section 27 in the second container 25 formed of the laminate film, when gas occurs and internal pressure rises on the inside of the battery 1, it is possible to rupture the exterior body 20 in the weakened section 27 and reduce the internal pressure. That is, it is possible to cause the weakened section 27 to function as a safety valve.

Second Embodiment

A battery 101 according to a second embodiment is explained.

Figure 14:
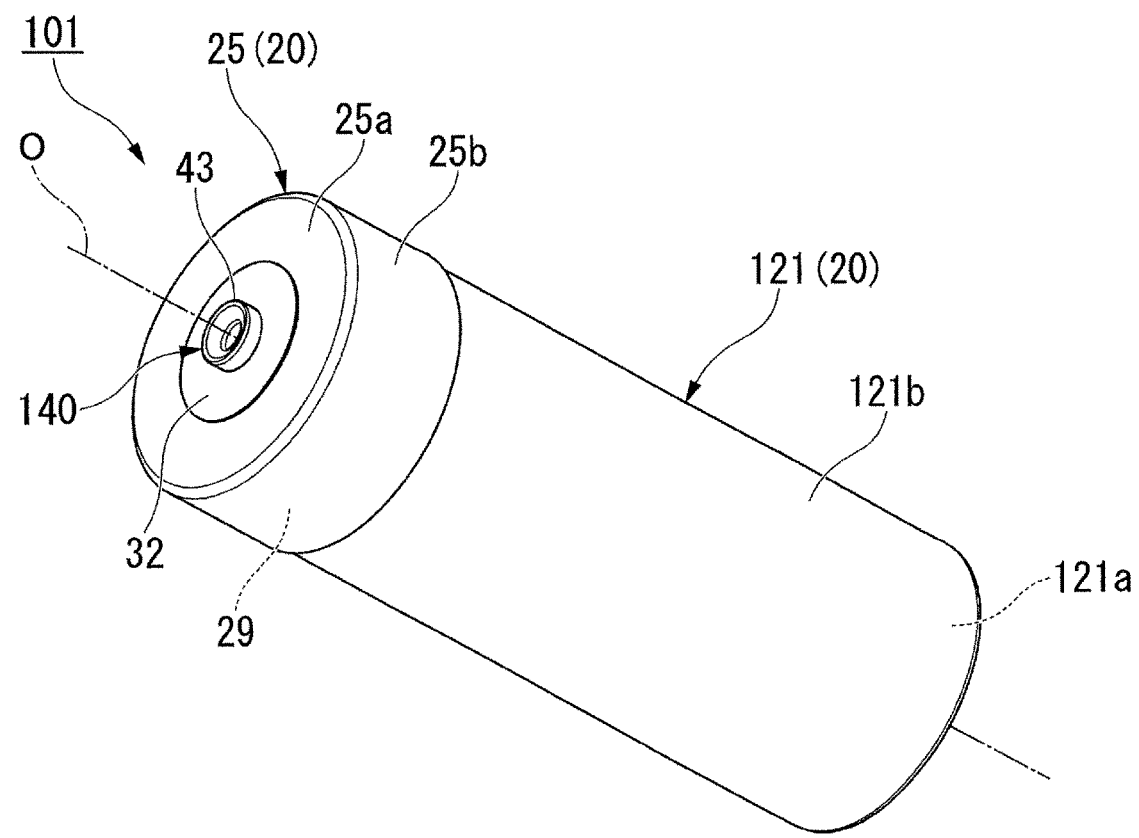
FIG. 14 is a perspective view of a battery according to a second embodiment.

FIG. 14 is a perspective view of the battery 101 according to the second embodiment.

In the first embodiment shown in FIGS. 1 and 2, the battery 1 is formed in a so-called button shape. The second embodiment shown in FIG. 14 is different from the first embodiment in that the battery 101 is formed in a so-called cylinder shape. Note that components same as the components in the first embodiment shown in FIGS. 1 and 2 are denoted by the same reference numerals and signs and detailed explanation of the components is omitted (the same applies to embodiments explained below).

As shown in FIG. 14, a first container 121 is formed such that a dimension in the axial direction is larger than the dimension of the second container 25. The second circumferential wall section 25b of the second container 25 surrounds an opening end portion of a first circumferential wall section 121b of the first container 121. An electrode terminal 140 is provided in the second bottom wall section 25a of the second container 25.

Figure 15:
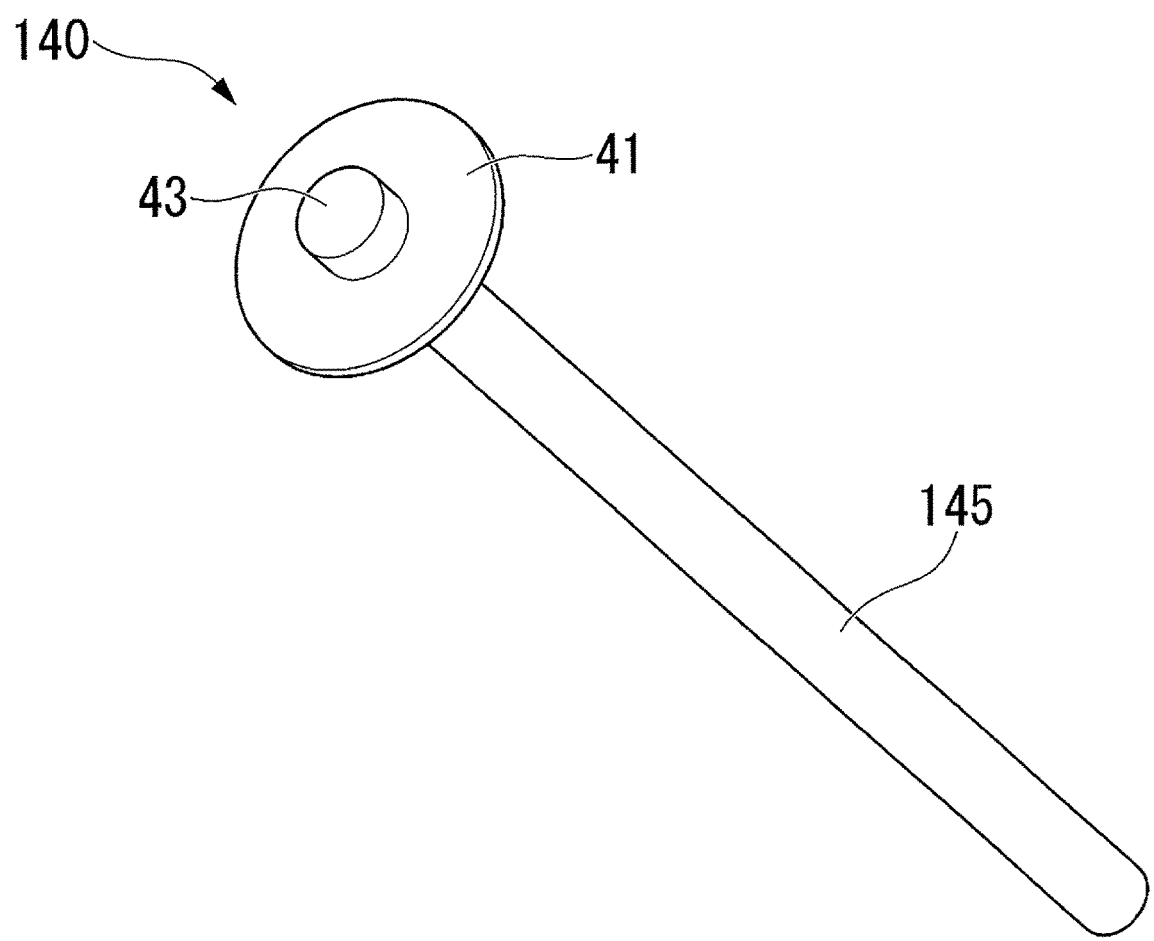
FIG. 15 is a perspective view of an electrode terminal according to the second embodiment.
Figure 16:
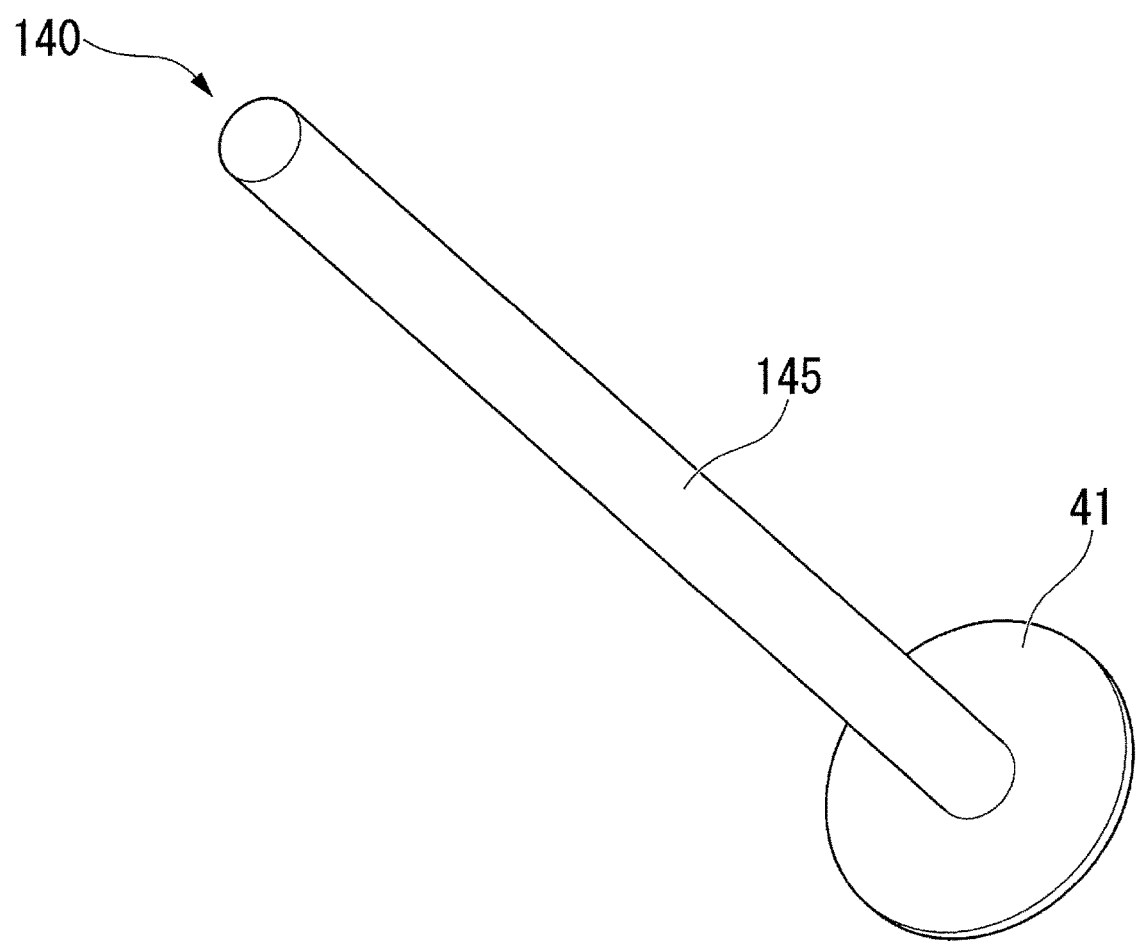
FIG. 16 is a perspective view of the electrode terminal according to the second embodiment.

FIGS. 15 and 16 are perspective views of the electrode terminal 140 according to the second embodiment.

As shown in FIGS. 14 to 16, the electrode terminal 140 includes the flange section 41, the drawing-out section 43, and a shaft section 145. The shaft section 145 is formed in a columnar shape. Between the first container 121 and the second container 25 (in the housing section), the shaft section 145 extends from the center of the flange section 41 toward the opposite side of the drawing-out section 43 along the axial direction. Note that the distal end face (a surface opposed to a first bottom wall section 121a in the axial direction) of the shaft section 145 is separated from the first bottom wall section 121a in the axial direction. Note that the shaft section 145 may be formed integrally with the flange section 41 or may be fit in a hole provided in the flange section 41. The electrode body 10 (see FIG. 2) is wound around the shaft section 145. That is, the shaft section 145 is used as a winding core of the electrode body 10. The positive electrode collector of the positive electrode body 11 (see FIG. 2) is connected to the shaft section 145 by welding or the like and conducts with the shaft section 145.

With this configuration, since the shaft section 145 can be used as the winding core of the electrode body 10, compared with a configuration in which a winding core separate from the electrode terminal 140 is used, it is possible to reduce the number of components. Since the positive electrode body 11 is conducted with the shaft section 145, it is possible to conduct the positive electrode body 11 and the electrode terminal 140 without using a separate member (e.g., the positive electrode tab 13 shown in FIG. 2). It is possible to reduce the number of components. Therefore, it is possible to achieve the battery 101 reduced in cost.

Note that, in the second embodiment, the shaft section 145 of the electrode terminal 140 is formed in a columnar shape. However, the shaft section 145 is not limited to this.

Figure 17:
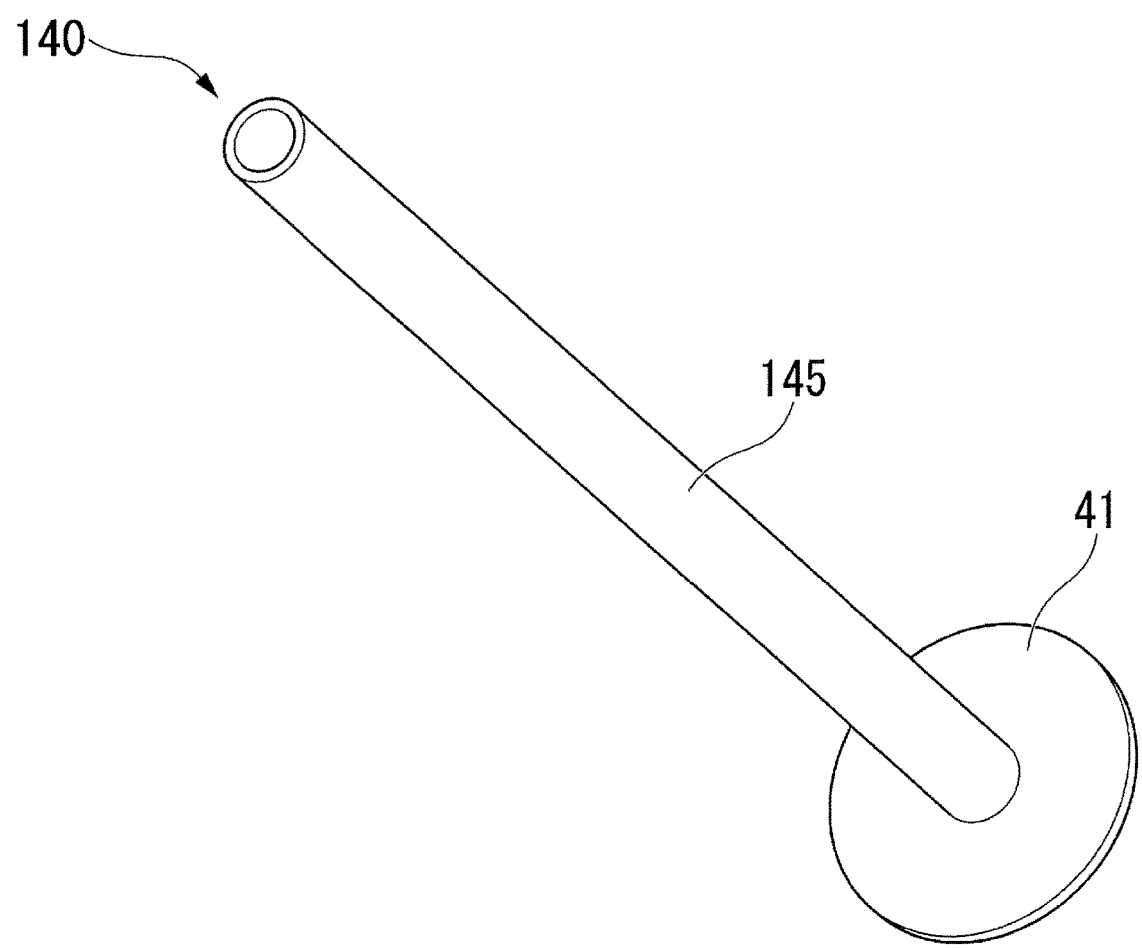
FIG. 17 is a perspective view of an electrode terminal according to a first modification of the second embodiment.
Figure 18:
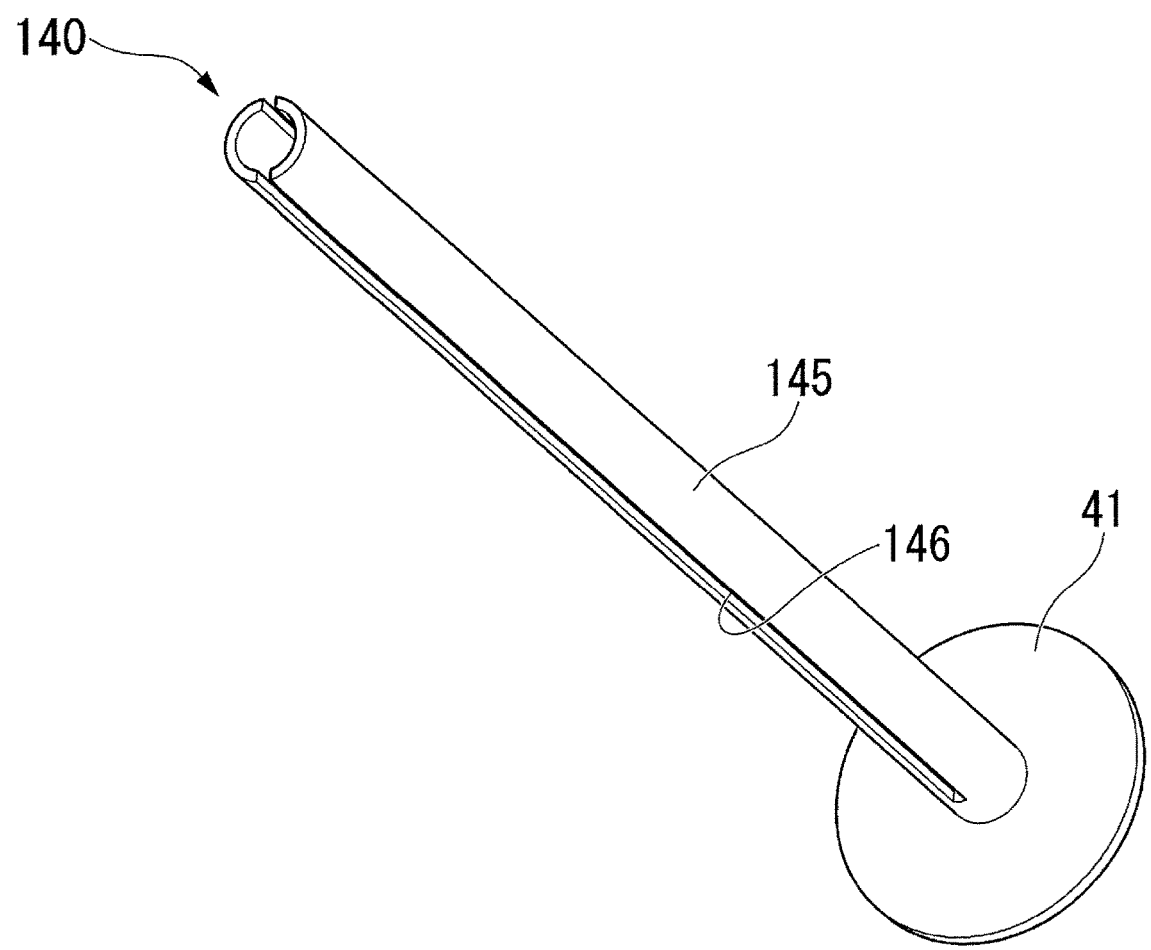
FIG. 18 is a perspective view of an electrode terminal according to a second modification of the second embodiment.
Figure 19:
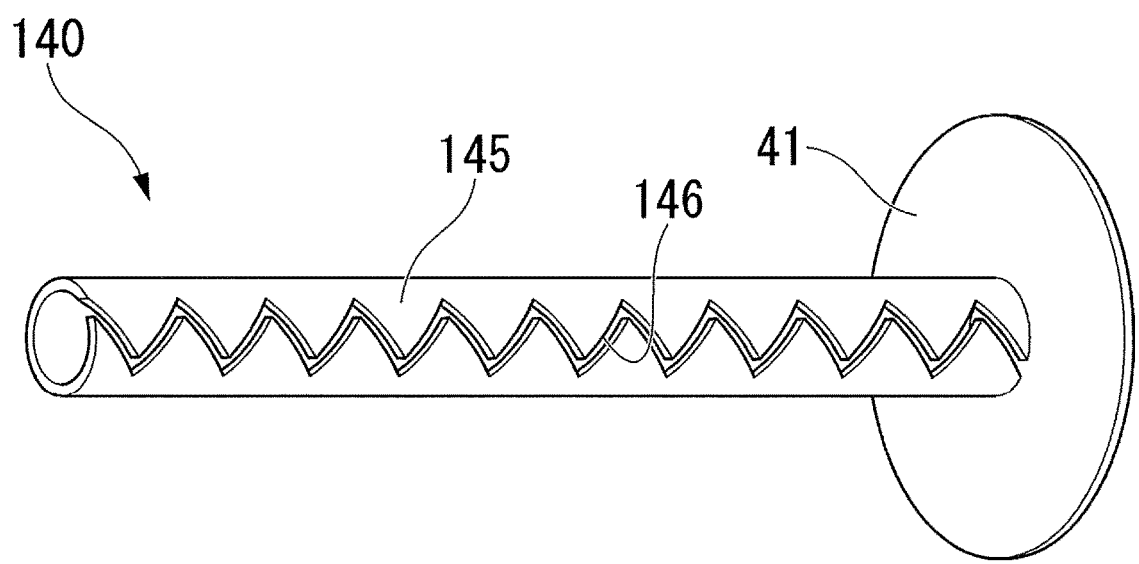
FIG. 19 is a perspective view of an electrode terminal according to a third modification of the second embodiment.
Figure 20:
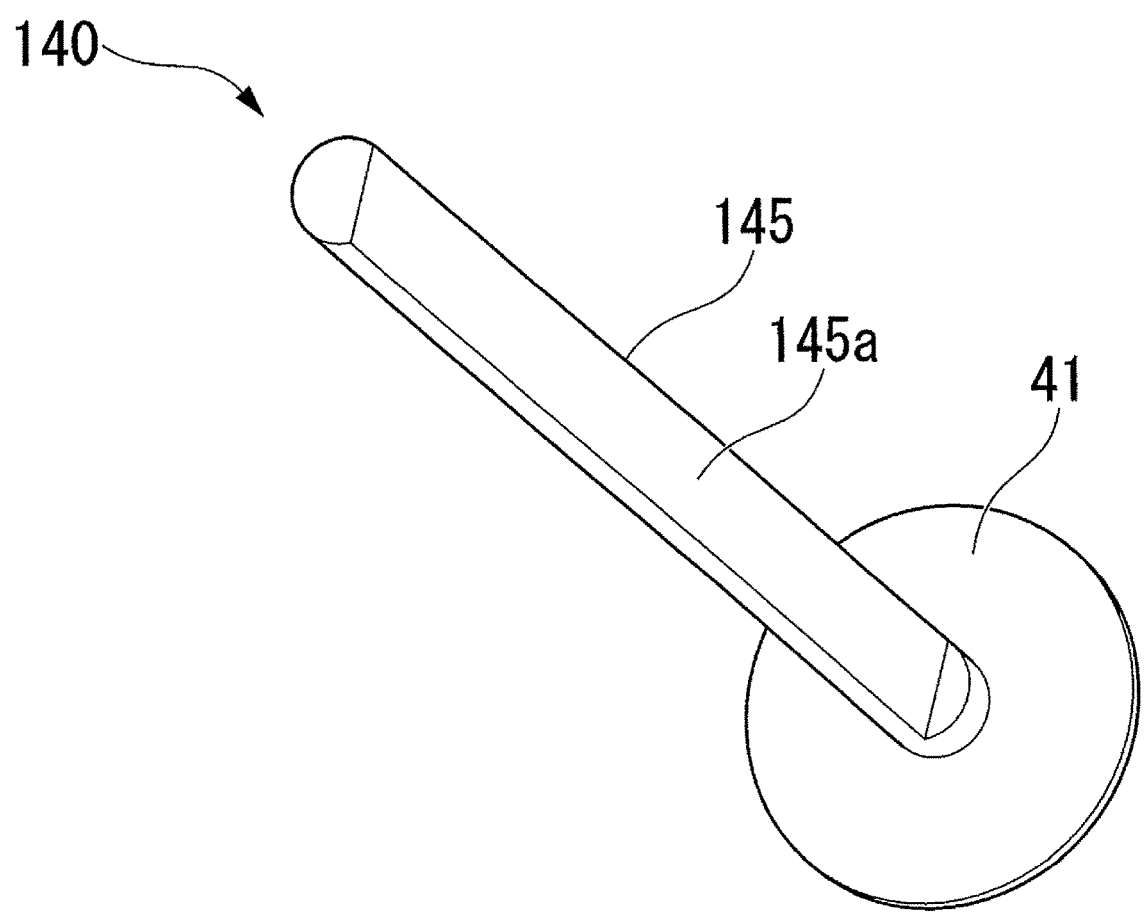
FIG. 20 is a perspective view of an electrode terminal according to a fourth modification of the second embodiment.

FIG. 17 is a perspective view of an electrode terminal according to a first modification of the second embodiment. FIG. 18 is a perspective view of an electrode terminal according to a second modification of the second embodiment. FIG. 19 is a perspective view of an electrode terminal according to a third modification of the second embodiment. FIG. 20 is a perspective view of an electrode terminal according to a fourth modification of the second embodiment.

As shown in FIG. 17, the shaft section 145 may be formed in a cylindrical shape. With this configuration, it is possible to reduce the electrode terminal 140 in weight.

As shown in FIG. 18, the shaft section 145 may be formed in a cylindrical shape and include at least one or more slits 146. In an example shown in the figure, the slits 146 pierce through the shaft section 145 in the radial direction and are extended in the axial direction. With this configuration, when the shaft section 145 is used as the winding core of the electrode body 10, it is possible to hold the positive electrode collector of the positive electrode body 11 in the slits 146. Therefore, it is possible to conduct the positive electrode body 11 and the shaft section 145 without welding the positive electrode body 11 and the shaft section 145. It is possible to reduce manufacturing cost of the battery 101. As shown in FIG. 19, the slits 146 may be formed in a wavy shape.

As shown in FIG. 20, a plane section 145a spreading in a direction orthogonal to a predetermined radial direction may be formed in a part of the outer circumferential surface of the shaft section 145. By welding the positive electrode collector of the positive electrode body 11 to the plane section 145a, it is possible to more firmly connect the positive electrode body 11 and the shaft section 145. Note that a cross sectional shape orthogonal to the axial direction of the shaft section 145 may be formed in a polygonal shape.

In the second embodiment, the flange section 41 of the electrode terminal 140 is disposed to be opposed to the inner surface of the second bottom wall section 25a of the second container 25. However, the flange section 41 is not limited to this.

Figure 21:
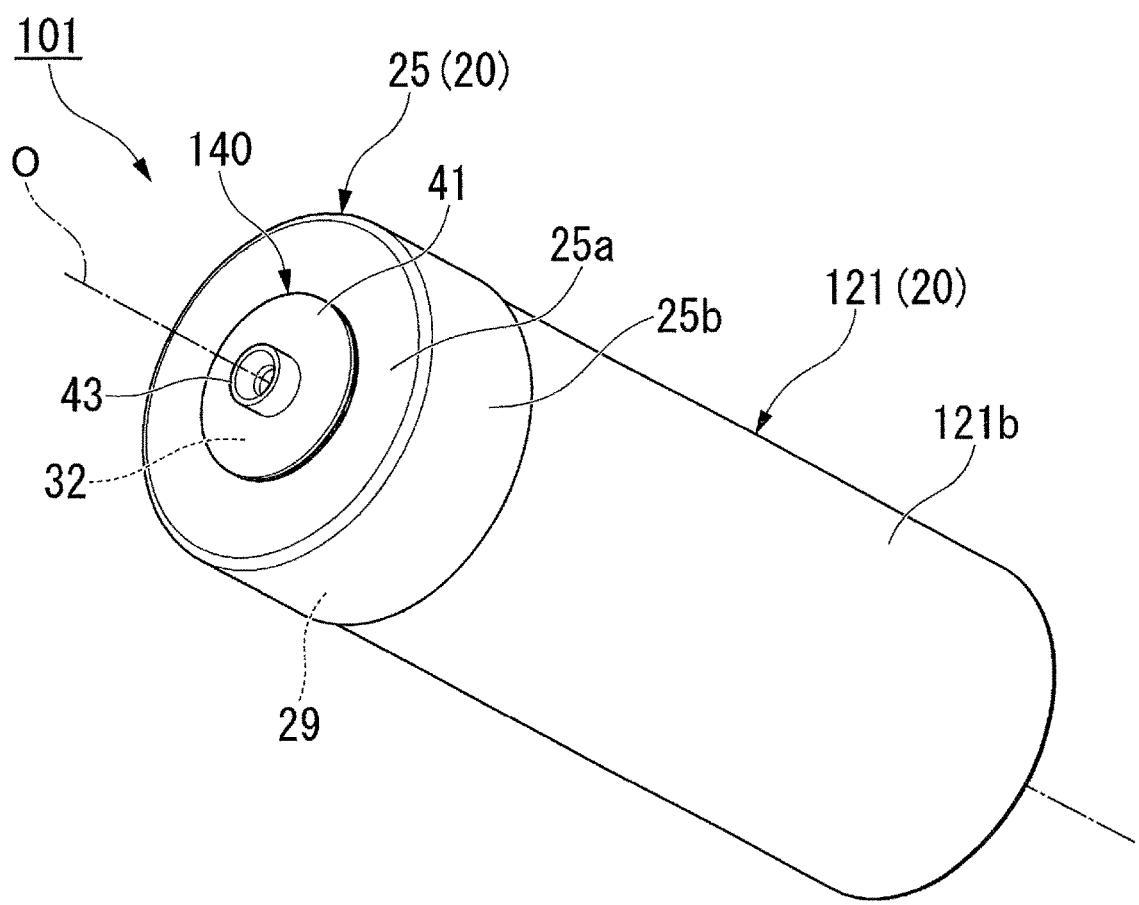
FIG. 21 is a perspective view of a battery according to a fifth modification of the second embodiment.

FIG. 21 is a perspective view of a battery according to a fifth modification of the second embodiment.

As shown in FIG. 21, the flange section 41 may be disposed to be opposed to the outer surface of the second bottom wall section 25a of the second container 25. In this case, the second ring film 32 (see FIG. 14) is disposed between the flange section 41 and the second bottom wall section 25a. The flange section 41 and the second bottom wall section 25a are thermally fused via the second ring film 32.

With this configuration, when gas occurs and internal pressure rises on the inside of the battery 101, it is possible to separate the flange section 41 from the second bottom wall section 25a to open the through-hole 26 (see FIG. 2) and reduce the internal pressure. That is, it is possible to cause the flange section 41 to function as a safety valve.

Third Embodiment

A battery 201 according to a third embodiment is explained.

Figure 22:
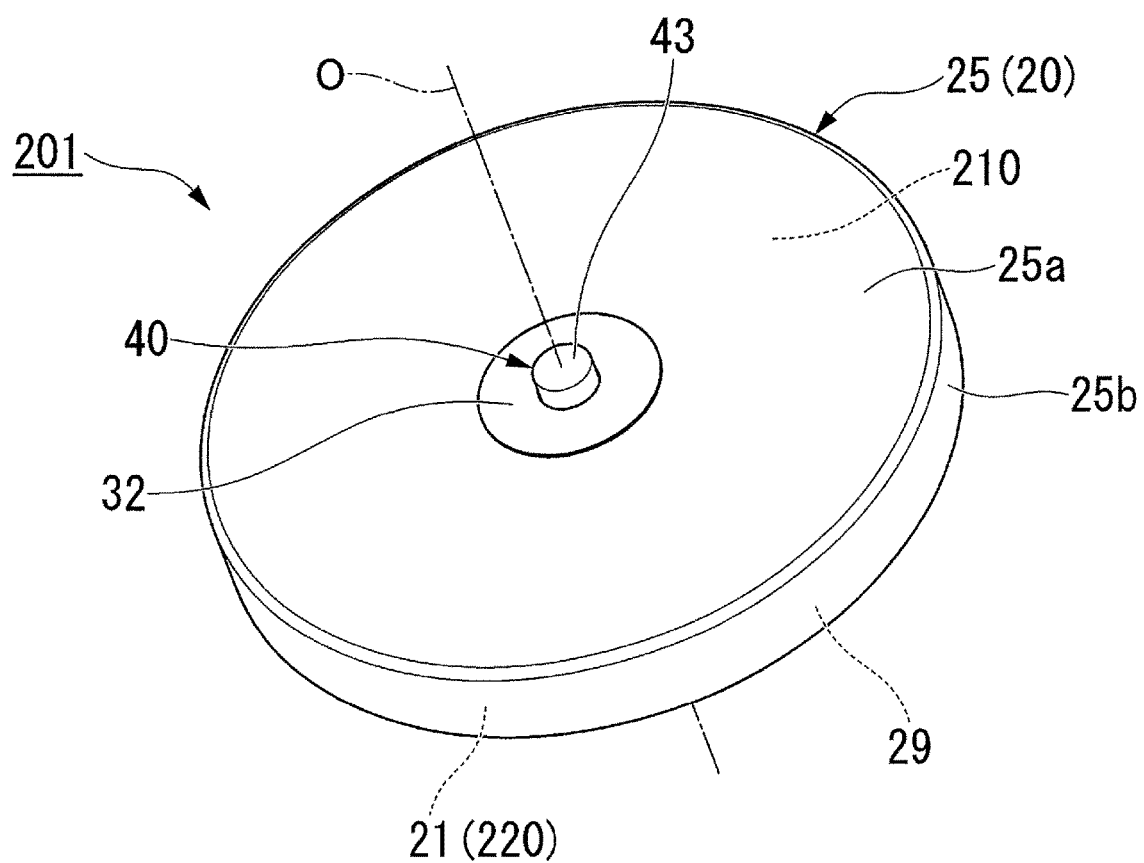
FIG. 22 is a perspective view of a battery according to a third embodiment.

FIG. 22 is a perspective view of the battery 201 according to the third embodiment.

In the first embodiment shown in FIGS. 1 and 2, the battery 1 is formed in a so-called button shape. The third embodiment shown in FIG. 22 is different from the first embodiment in that the battery 201 is formed in a so-called coin shape.

Figure 23:
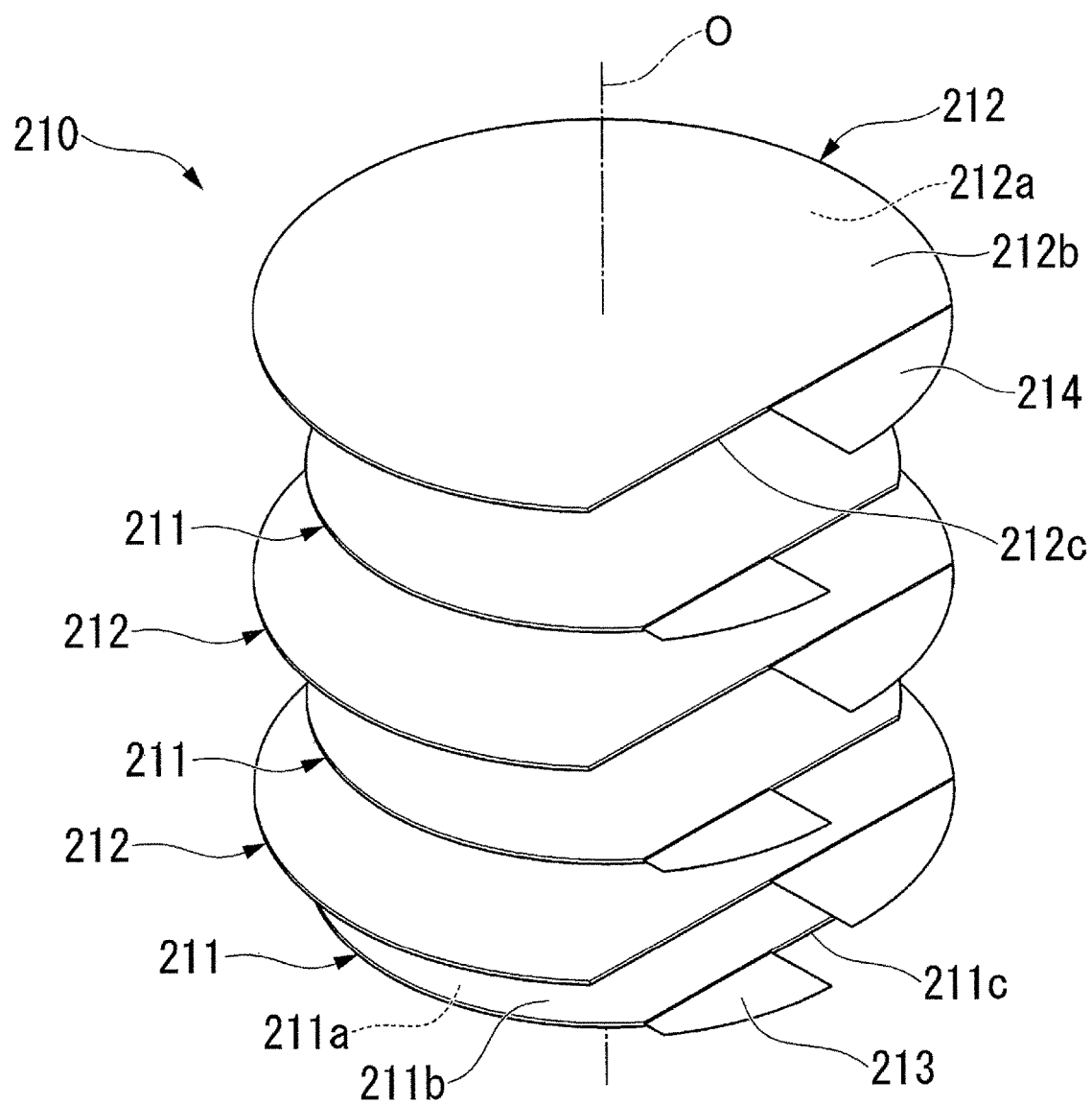
FIG. 23 is an exploded perspective view of an electrode body according to the third embodiment.

FIG. 23 is an exploded perspective view of an electrode body according to the third embodiment.

As shown in FIG. 23, an electrode body 210 is configured by alternately stacking a plurality of positive electrode bodies 211 and negative electrode bodies 212 in the axial direction via not-shown separators.

The positive electrode bodies 211 are formed in a circular shape when viewed from the axial direction. The positive electrode bodies 211 include positive electrode collectors 211a made of circular metal foil and positive electrodes 211b disposed on the surfaces of the positive electrode collectors 211a.

Cutout sections 211c cut-out in a linear shape in a direction orthogonal to a predetermined radial direction are formed in a part in the circumferential direction in the positive electrode bodies 211. In the positive electrode collectors 211a, positive electrode tabs 213 projecting from the cutout sections 211c are integrally formed. The positive electrode tabs 213 project to the outer side in the radial direction (a direction crossing the stacking direction) from one side in the circumferential direction in the cutout sections 211c. Therefore, the positive electrode tabs 213 overlap in the axial direction.

The negative electrode bodies 212 are formed in a circular shape when viewed from the axial direction. The negative electrode bodies 212 include negative electrode collectors 212a made of circular metal foil and negative electrodes 212b disposed on the surfaces of the negative electrode collectors 212a.

Cutout sections 212c cut-out in a linear shape in the direction orthogonal to the predetermined radial direction are formed in a part in the circumferential direction in the negative electrode bodies 212. In the negative electrode collectors 212a, negative electrode tabs 214 projecting from the cutout sections 212c are integrally formed. The negative electrode tabs 214 project to the outer side in the radial direction from the other side in the circumferential direction in the cutout sections 212c. Therefore, the negative electrode tabs 214 overlap in the axial direction. Further, in the electrode body 210, the positive electrode tabs 213 and the negative electrode tabs 214 are disposed in positions not overlapping in the axial direction.

The positive electrodes 211b are disposed further on the inner side than the outer circumferential edges of the negative electrodes 212b when viewed from the axial direction. The positive electrode tabs 213 are connected to one another by welding or the like and connected to the flange section 41 (see FIG. 2) of the electrode terminal 40 and conduct with the flange section 41. The negative electrode tabs 214 are connected to one another by welding or the like and connected to the first container 21 (see FIG. 22) and conduct with the first container 21.

By forming the electrode body 210 by alternately stacking the positive electrode bodies 211 and the negative electrode bodies 212 formed in the circular shape in this way, it is possible to house the electrode body 210 in an exterior body 220 of the coin-type battery 201, a dimension in the axial direction of which is formed sufficiently small compared with the outer diameter, shown in FIG. 22.

Note that the electrode body included in the battery 201 is not limited to the form shown in FIG. 23. As the electrode body included in the battery 201, an electrode body wound in the same manner as the electrode body 10 shown in FIG. 2 may be compressed in a direction orthogonal to a winding axis and formed in a flat shape. Consequently, it is possible to house the electrode body in the exterior body 220 of the coin-type battery 201.

Fourth Embodiment

A battery 301 according to a fourth embodiment is explained.

Figure 24:
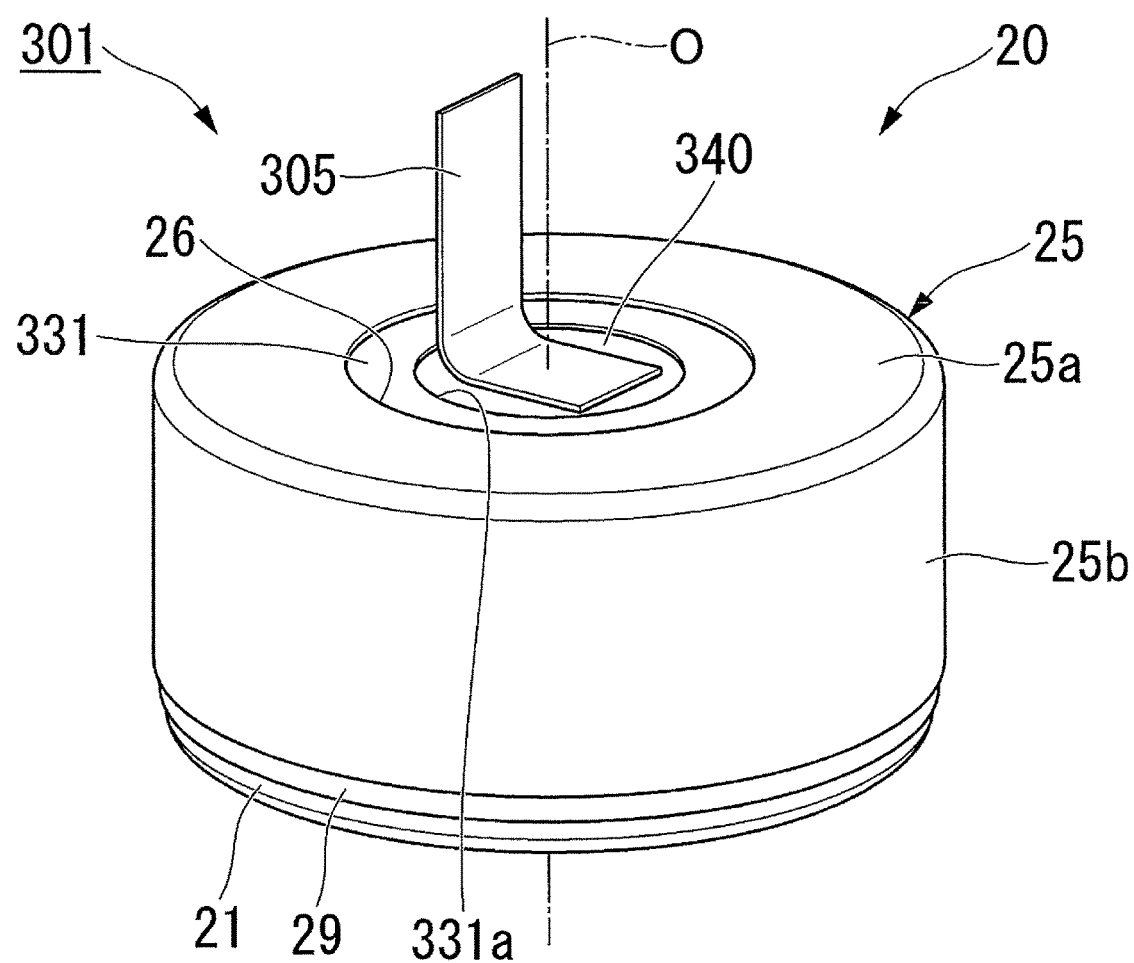
FIG. 24 is a perspective view of a battery according to a fourth embodiment.
Figure 25:
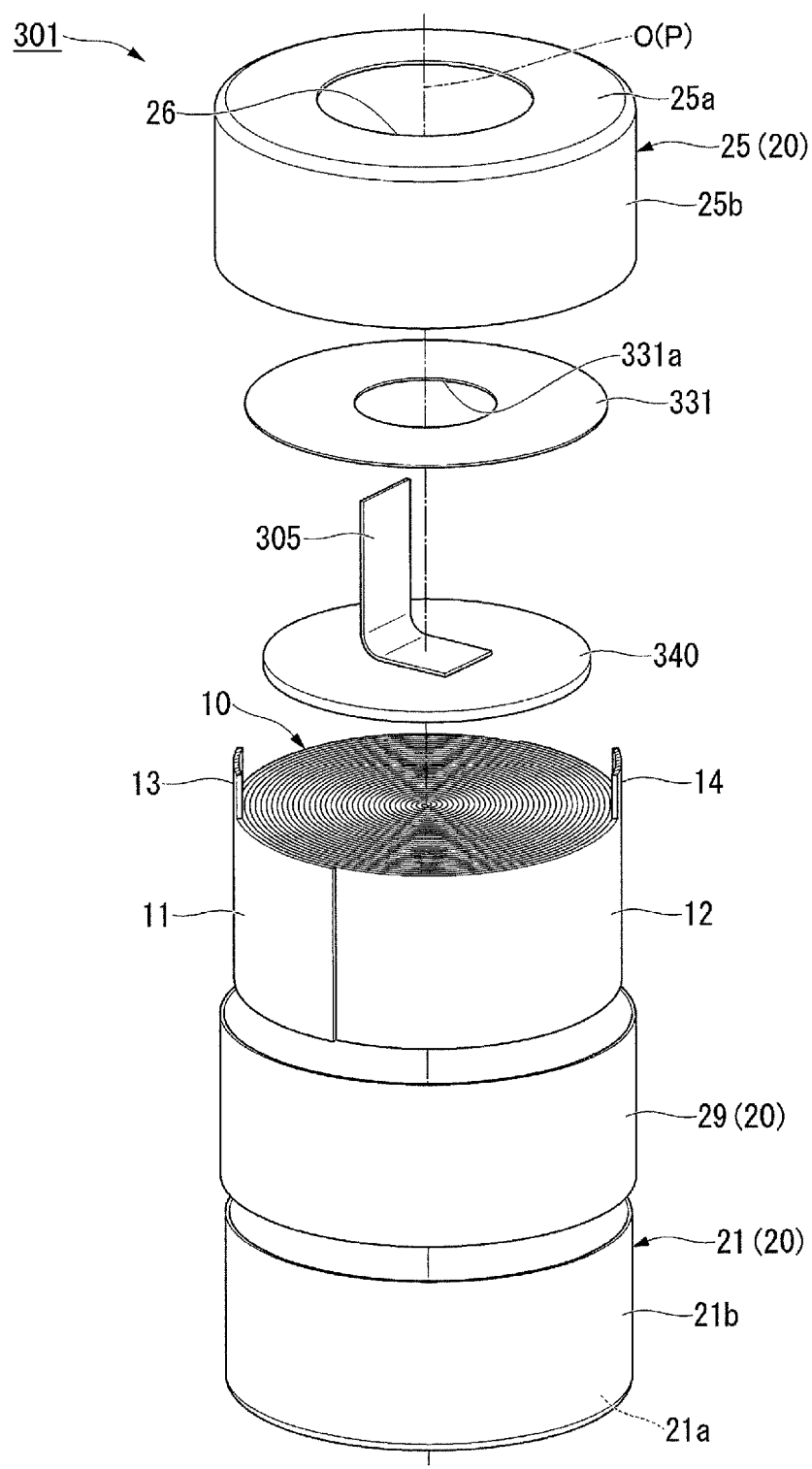
FIG. 25 is an exploded perspective view of the battery according to the fourth embodiment.

FIG. 24 is a perspective view of the battery 301 according to the fourth embodiment. FIG. 25 is an exploded perspective view of the battery 301 according to the fourth embodiment.

In the first embodiment shown in FIGS. 1 and 2, the ring films 31 and 32 are disposed on both the surfaces of the second bottom wall section 25a of the second container 25. The fourth embodiment shown in FIGS. 24 and 25 is different from the first embodiment in that a first ring film 331 is disposed on only the inner surface of the second bottom wall section 25a of the second container 25. In the first embodiment, the first ring film 31 includes the wall section 31b that covers the inner circumferential surface of the through-hole 26. The fourth embodiment is different from the first embodiment in that the first ring film 331 is formed flat perpendicularly along the center axis O and does not include a wall section that covers the inner circumferential surface of the through-hole 26. In the seventh modification of the first embodiment, the battery 1 includes the electrode terminal 40 configured by the flange section 41 and the drawing-out section 43, which are integrally formed, and the external terminal member 5 provided further on the outer side than the exterior body 20 and connected to the drawing-out section 43. The fourth embodiment is different from the first embodiment in that the battery 301 includes an electrode terminal 340 equivalent to the flange section 41 and an external terminal member 305 provided further on the outer side than the exterior body 20 and connected to the electrode terminal 340.

As shown in FIGS. 24 and 25, a first film through-hole 331a coaxial with the through-hole 26 is formed in the first ring film 331. The inner diameter of the first film through-hole 331a is smaller than the inner diameter of the through-hole 26. The first ring film 331 is thermally fused to the inner surface of the second bottom wall section 25a and covers the circumference of the through-hole 26 in the second bottom wall section 25a from the inner side in the axial direction.

The electrode terminal 340 is formed of a metal material such as aluminum or an aluminum alloy. The electrode terminal 340 is formed in a disk shape and disposed coaxially with the center axis O. The outer diameter of the electrode terminal 340 is smaller than the inner diameter of the first circumferential wall section 21b of the first container 21 and larger than the inner diameter of the through-hole 26. The electrode terminal 340 is thermally fused to the second bottom wall section 25a in a state in which the first ring film 331 is held between the electrode terminal 340 and the second bottom wall section 25a. Consequently, communication between the inside and the outside of the exterior body 20 through the through-hole 26 is blocked. The center of the electrode terminal 340 is exposed to the axial direction outer side through the through-hole 26 and the first film through-hole 331a. The positive electrode tab 13 is electrically connected to the electrode terminal 340 on the inside of the exterior body 20.

The external terminal member 305 is a long rectangular plate-like metal piece formed of a metal material such as aluminum, nickel, or copper applied with nickel plating. One end portion of the external terminal member 305 is disposed in a surface alignment manner with respect to and electrically connected to the center exposed to the axial direction outer side in the electrode terminal 340. The external terminal member 305 and the electrode terminal 340 are fixed by, for example, ultrasonic welding, laser welding, or resistance welding. The external terminal member 305 is bent substantially at a right angle in the longitudinal direction intermediate portion of the external terminal member 305 and extends to separate from the exterior body 20 along the axial direction. Note that the external terminal member 305 is desirably fixed to the electrode terminal 340 in advance during assembly of the battery 301.

In this way, according to this embodiment, by forming the external terminal member 305 from a metal material easily joined to the external lead wire by soldering or the like, it is possible to form the electrode terminal 340 from a material difficult to be joined by soldering or the like such as aluminum. Therefore, it is possible to easily select the material of the electrode terminal 340.

Moreover, since the external terminal member 305 extends to separate from the exterior body 20, it is possible to improve handleability of the battery 301.

Note that, in the fourth embodiment, the external terminal member 305 is the metal piece. However, the external terminal member 305 is not limited to this. The external terminal member may be a wire-like member such as a copper wire or a copper wire applied with tin plating. When the external terminal member is the wire-like member, since a sectional shape has no directivity, the external terminal member is less easily cut when being handled. In particular, if the external terminal member is a wire applied with coating or a twisted wire obtained by bundling several wires, the external terminal member is less easily cut in handling during connection to an external apparatus.

In the fourth embodiment, the first ring film 331 does not cover the inner circumferential surface of the through-hole 26 of the second container 25. However, like the first ring film 31 according to the first embodiment, the first ring film 331 may include an annular wall section that covers the inner circumferential surface of the through-hole 26. In this case, in a state before the first ring film is melted, the wall section is desired to be configured to project from the through-hole 26 to cover the inner circumferential surface of the through-hole 26.

In the fourth embodiment, the external terminal member 305 extends to separate from the exterior body 20 along the axial direction. However, the external terminal member 305 is not limited to this.

Figure 26:
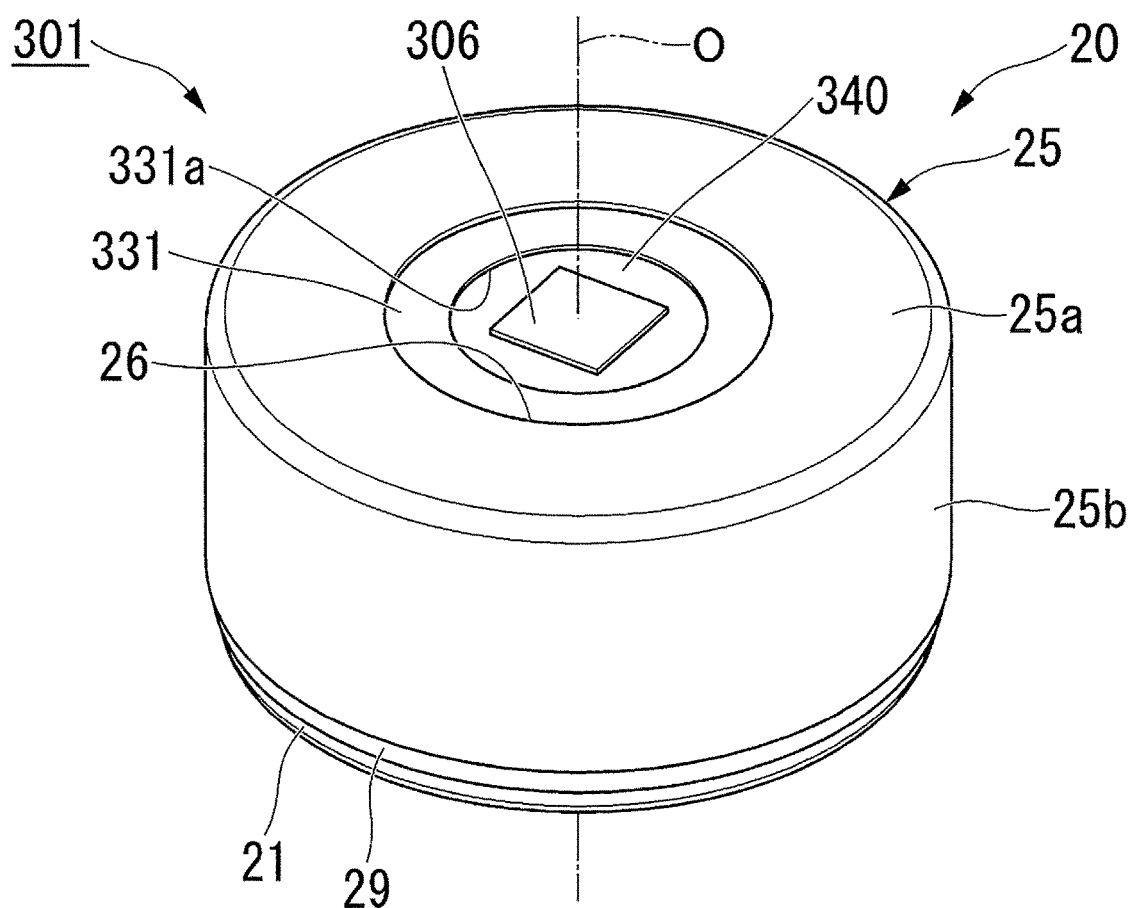
FIG. 26 is a perspective view of a battery according to a modification of the fourth embodiment.

FIG. 26 is a perspective view of a battery according to a modification of the fourth embodiment.

For example, as shown in FIG. 26, an external terminal member 306 may be formed in a rectangular flat plate shape smaller than the first film through-hole 331a and electrically connected and fixed to the electrode terminal 340 in a state in which the external terminal member 306 is disposed in a surface alignment manner with respect to the center of the electrode terminal 340. Note that the shape of the external terminal member 306 is not limited to the shape shown in the figure and may be a rectangular shape rounded at corners or a circular shape. In particular, it is desirable to form the external terminal member 306 in the circular shape because it is less likely that members around the external terminal member 306 are damaged by corners.

With this configuration, since the external lead wire or the like can be joined to the external terminal member 306, as in the fourth embodiment, it is possible to form the electrode terminal 340 from a material difficult to be joined by soldering or the like such as aluminum. Therefore, it is possible to easily select the material of the electrode terminal 340.

Fifth Embodiment

A first container 421 of a battery according to a fifth embodiment is explained.

Figure 27:
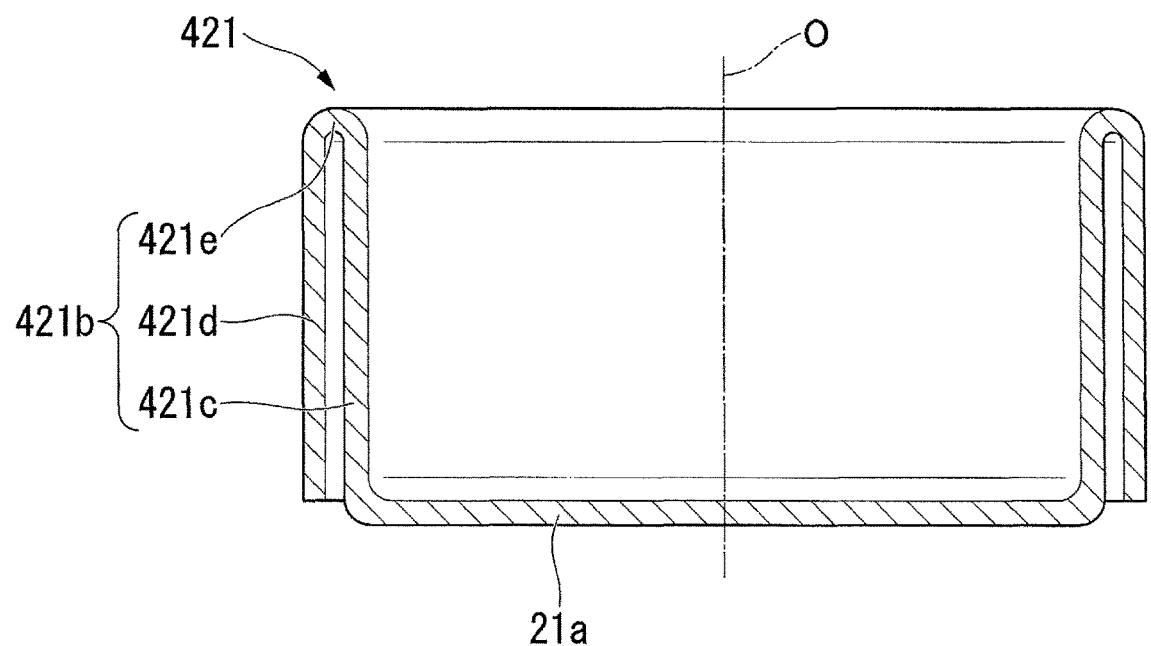
FIG. 27 is a sectional view of a first container according to a fifth embodiment.

FIG. 27 is a sectional view passing the center axis O of the first container 421 according to the fifth embodiment.

As shown in FIG. 27, the fifth embodiment is different from the first embodiment shown in FIG. 2 in that the first container 421 includes a first circumferential wall section 421b formed in a plurality of layers (in the embodiment, two layers).

The first container 421 is formed of a metal material having conductivity. The first container 421 includes the first bottom wall section 21a and the first circumferential wall section 421b. The first circumferential wall section 421b extends from the outer circumferential edge of the first bottom wall section 21a along the axial direction and thereafter is folded back toward the radial direction outer side and extends toward the first bottom wall section 21a side along the axial direction again. In other words, the first circumferential wall section 421b includes a cylindrical inner circumferential wall section 421c forming a housing space, in which the electrode body 10 (see FIG. 2) is housed, and opposed to the electrode body 10, a cylindrical outer circumferential wall section 421d surrounding the inner circumferential wall section 421c over the entire circumference from the radial direction outer side, and an annular connecting section 421e that connects the inner circumferential wall section 421c and the outer circumferential wall section 421d over the entire circumference in the circumferential direction.

A dimension in the axial direction of the outer circumferential wall section 421d is equal to a dimension in the axial direction of the inner circumferential wall section 421c. The inner circumferential wall section 421c and the outer circumferential wall section 421d are disposed to be spaced apart in the radial direction. The fusing member 29 (see FIG. 2) is thermally fused to the outer circumferential surface of the outer circumferential wall section 421d. The connecting section 421e is provided at the opening end edge of the first container 421. The connecting section 421e extends from the end edge of the inner circumferential wall section 421c to the end edge of the outer circumferential wall section 421d. In an example shown in the figure, the connecting section 421e is curved to bulge toward an opening direction of the first container 421 in the axial direction. The radial direction center of the connecting section 421e extends along the radial direction (the thickness direction of the first circumferential wall section 421b). The first container 421 is formed by, for example, drawing.

In this way, in this embodiment, since the first circumferential wall section 421b includes the inner circumferential wall section 421c and the outer circumferential wall section 421d surrounding the inner circumferential wall section 421c, compared with when the first circumferential wall section is configured by one circumferential wall section, it is possible to improve the strength of the first circumferential wall section 421b. Consequently, compared with when the first circumferential wall section is configured by one circumferential wall section, it is possible to strongly press the second circumferential wall section 25b toward the first circumferential wall section 421b when the fusing member 29 is fused to the first circumferential wall section 421b and the second circumferential wall section 25b. Therefore, it is possible to more surely fuse the fusing member 29 to the first circumferential wall section 421b and the second circumferential wall section 25b. It is possible to improve the airtightness inside the battery. It is possible to improve work efficiency and yield in fusing the fusing member 29 to the first circumferential wall section 421b and the second circumferential wall section 25b.

Since the radial direction center of the connecting section 421e extends along the thickness direction (the radial direction) of the first circumferential wall section 421b, when an external force in the thickness direction of the first circumferential wall section 421b acts on the first circumferential wall section 421b, it is possible to cause the connecting section 421e to function like a rib and suppress deformation of the first circumferential wall section 421b. Therefore, it is possible to improve the strength of the first circumferential wall section 421b against the external force in the thickness direction of the first circumferential wall section 421b. Consequently, when the fusing member 29 is fused to the first circumferential wall section 421b and the second circumferential wall section 25b, it is possible to strongly press the second circumferential wall section 25b toward the first circumferential wall section 421b. Therefore, it is possible to more surely fuse the fusing member 29 to the first circumferential wall section 421b and the second circumferential wall section 25b. It is possible to improve the airtightness inside the battery. It is possible to improve the work efficiency and the yield in fusing the fusing member 29 to the first circumferential wall section 421b and the second circumferential wall section 25b.

Note that, in the example shown in the figure, a gap is provided between the inner circumferential wall section 421c and the outer circumferential wall section 421d. However, the inner circumferential wall section 421c and the outer circumferential wall section 421d may be disposed without a gap. In this embodiment, the inner circumferential wall section 421c and the outer circumferential wall section 421d are integrally formed via the connecting section 421e.

However, the inner circumferential wall section and the outer circumferential wall section may be formed separately and joined in a stacked state.

Note that the present invention is not limited to the embodiments explained with reference to the drawings. Various modifications are conceivable in the technical scope of the present invention.

For example, in the embodiments, the first container 21 is electrically connected to the negative electrode body 12 and the electrode terminal 40 is electrically connected to the positive electrode body 11. However, the present invention is not limited to this. The first container may be electrically connected to the positive electrode body 11 and the electrode terminal may be electrically connected to the negative electrode body 12. In this case, it is desirable to form the first container from aluminum, an aluminum alloy, or the like. It is desirable to form the electrode terminal from SUS or the like.

In the embodiments, the first container 21 is formed of the metal material and the second container 25 is formed of the laminate film. However, the present invention is not limited to this. For example, the first container may be formed of the laminate film and the second container may be formed of the metal material. Both of the first container and the second container may be formed of the metal material or the laminate film.

In the embodiments, as an example of the button-type electrochemical cell, the nonaqueous electrolyte secondary battery is explained. However, the present invention is not limited to this example. The configuration explained above can be applied to an electrical double layer capacitor, a primary battery, and the like. Note that, when a battery is applied as the electrochemical cell, as an active material of a positive electrode and a negative electrode, a material that can occlude or emit multivalent cation such as $Mg^{2+}$ or $Al^{3+}$ other than univalent cation such as $Li^+$ or $Na^+$ can be used. When the electrochemical cell is configured as the electrical double layer capacitor of the present invention, high energy density can be realized by using a nonaqueous electrolyte as the electrolyte.

Besides, it is possible to substitute the components in the embodiment with well-known components as appropriate without departing from the spirit of the present invention. The embodiments and the modifications explained above may be combined as appropriate.

What is claimed is:

1. An electrochemical cell comprising:
    an electrode body including a positive electrode body and a negative electrode body; and
    an exterior body housing the electrode body, wherein the exterior body includes:
        a first container having a bottomed cylindrical shape and including a first circumferential wall section;
        a second container having a bottomed cylindrical shape and including a second circumferential wall section surrounding the first circumferential wall section, the second container housing the electrode body between the second container and the first container; and
        a fusing member interposed between the first circumferential wall section and the second circumferential wall section and fused to the first circumferential wall section and the second circumferential wall section, the fusing member comprising a thermally deformable layer of material different from that the first container.

2. The electrochemical cell according to claim 1, wherein the first container is formed of a metal material, and the second container is formed of a laminate film including a metal material and a resin material.

3. The electrochemical cell according to claim 2, wherein a bottom wall section of the second container includes a through-hole therein, and an electrode terminal connected to one of the positive electrode body and the negative electrode body resides in the through-hole.

4. The electrochemical cell according to claim 3, wherein an inner circumferential surface of the through-hole is covered by an insulating material.

5. The electrochemical cell according to claim 3, wherein the electrode terminal includes a flange section opposed to an inner surface of the bottom wall section of the second container.

6. The electrochemical cell according to claim 3, wherein the electrochemical cell further includes an external terminal member on an outer side of the exterior body that conducts with the electrode terminal.

7. The electrochemical cell according to claim 3, wherein the electrode terminal includes a shaft section extending along an axial direction of the second container in the exterior body, and one of the positive electrode body and the negative electrode body is connected to the shaft section and the electrode body is wound around the shaft section.

8. The electrochemical cell according to of claim 1, wherein the first circumferential wall section includes:
    an inner circumferential wall section; and
    an outer circumferential wall section surrounding the inner circumferential wall section.

9. The electrochemical cell according to claim 8, wherein the first circumferential wall section includes an integral connecting section that connects the inner circumferential wall section and the outer circumferential wall section over an entire circumference, and the integral connecting section extends along a thickness direction of the first circumferential wall section.

10. The electrochemical cell according to claim 1, wherein the electrode body comprises a stacked structure of the positive electrode body and the negative electrode body, and the electrode body includes a tab projecting in a direction crossing a stacking direction with respect to a stacked portion of the positive electrode body and the negative electrode body.

* * * * *